US011539788B2

(12) United States Patent
Nakata et al.

(10) Patent No.: US 11,539,788 B2
(45) Date of Patent: Dec. 27, 2022

(54) INFORMATION PROCESSING SYSTEM AND METHOD OF CONTROLLING INFORMATION PROCESSING SYSTEM

(71) Applicant: Hitachi, Ltd., Tokyo (JP)

(72) Inventors: Yu Nakata, Tokyo (JP); Hiroaki Konoura, Tokyo (JP); Masafumi Kinoshita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/275,535

(22) PCT Filed: Feb. 26, 2020

(86) PCT No.: PCT/JP2020/007813
§ 371 (c)(1),
(2) Date: Mar. 11, 2021

(87) PCT Pub. No.: WO2020/240954
PCT Pub. Date: Dec. 3, 2020

(65) Prior Publication Data
US 2022/0116446 A1    Apr. 14, 2022

(30) Foreign Application Priority Data

May 28, 2019  (JP) .............................. JP2019-099564
Sep. 11, 2019  (JP) .............................. JP2019-165080

(51) Int. Cl.
*H04L 67/101* (2022.01)
*G06F 9/46* (2006.01)
(Continued)

(52) U.S. Cl.
CPC ............ *H04L 67/101* (2013.01); *G06F 9/466* (2013.01); *H04L 67/1021* (2013.01); *H04L 67/1097* (2013.01)

(58) Field of Classification Search
CPC ............... H04L 67/101; H04L 67/1021; H04L 67/1097; G06F 9/466
See application file for complete search history.

(56) References Cited

U.S. PATENT DOCUMENTS 9,639,544 B1 *  5/2017 Smith ................... G06F 16/148
10,148,498 B1 * 12/2018 Gould ................. H04L 67/1095
(Continued)

FOREIGN PATENT DOCUMENTS

JP    2014-109800 A    6/2014
JP    2014-167685 A    9/2014
(Continued)

OTHER PUBLICATIONS

International Search Report (PCT/ISA/210) issued in PCT Application No. PCT/JP2020/007813 dated Jun. 2, 2020 with English translation (four (4) pages).

(Continued)

*Primary Examiner* — Brian Whipple
*Assistant Examiner* — James Ross Hollister
(74) *Attorney, Agent, or Firm* — Crowell & Moring LLP

(57) ABSTRACT

Software that implements processing executed through coordination between multiple hubs is efficiently developed. An information processing system comprises a plurality of AP execution devices that are information processing apparatuses provided in each of a plurality of hubs to execute AP software. Each of the AP execution devices stores common AP software that executes the same processing blocks in the same order. The AP software includes transfer processing blocks implementing processing to coordinate processing of the processing blocks executed by a first one of the AP execution devices in a first one of the hubs with a second one of the AP execution devices in a second one of the hubs. Once the processing reaches a first one of the transfer (Continued)

processing blocks during sequential execution of the processing blocks of the AP software, the first AP execution device transmits a coordination start message notifying of start of the coordination, to the second AP execution device. Once the second AP execution device receives the coordination start message, the second AP execution device starts sequential execution from a processing block following the first transfer processing block.

20 Claims, 37 Drawing Sheets

(51) Int. Cl.
*H04L 67/1021* (2022.01)
*H04L 67/1097* (2022.01)

(56) References Cited

U.S. PATENT DOCUMENTS

| | | | | |
|---|---|---|---|---|
| 2007/0288585 | A1* | 12/2007 | Sekiguchi | G06F 11/2038 709/209 |
| 2010/0121984 | A1* | 5/2010 | Oka | G06F 9/52 709/248 |
| 2013/0080559 | A1* | 3/2013 | Rao | H04L 43/10 709/208 |
| 2014/0089459 | A1* | 3/2014 | Werr | H04L 67/1095 709/217 |
| 2014/0156735 | A1* | 6/2014 | Yamasaki | H04L 69/28 709/203 |
| 2014/0379100 | A1* | 12/2014 | Kitayama | G05B 19/0421 700/20 |
| 2015/0286495 | A1* | 10/2015 | Lee | G06Q 10/10 718/102 |
| 2017/0346690 | A1* | 11/2017 | Dorado | H04L 41/0823 |
| 2018/0074855 | A1* | 3/2018 | Kambatla | G06F 9/505 |
| 2020/0310837 | A1* | 10/2020 | Sethumadhavan | G06F 3/0659 |

FOREIGN PATENT DOCUMENTS

| | | |
|---|---|---|
| JP | 2014-241119 A | 12/2014 |
| JP | 2015-505404 A | 2/2015 |
| JP | 2018-92565 A | 6/2018 |

OTHER PUBLICATIONS

Japanese-language Written Opinion (PCT/ISA/237) issued in PCT Application No. PCT/JP2020/007813 dated Jun. 2, 2020 (four (4) pages).

Korean-language Office Action issued in Korean Application No. 10-2021-7007071 dated Aug. 31, 2022 with English translation (16 pages).

* cited by examiner

EXAMPLE OF AP EXECUTION DEVICE INFORMATION

EXAMPLE OF TRANSFER START MESSAGE (S2014)

```
0001  {
0002      "dest_properities": "edge_siteA",
0003      "block_id": "rnhawwb8",
0004      "start_end": "start",
0005      "payload": {
0006          (INPUT PARAMETER FOR NEXT PROCESSING BLOCK)
0007      }
0008  }
```

FIG. 22

EXAMPLE OF COORDINATION START MESSAGE (S2016)

```
0001  {
0002      "host": "cloud_machine_1"
0003      "block_id": "rnhawwb8",
0004      "start_end": "start",
0005      "payload": {
0006          (INPUT PARAMETER FOR NEXT PROCESSING BLOCK)
0007      }
0008  }
```

FIG. 23

EXAMPLE OF COORDINATION END MESSAGE (S2022)

```
0001  {
0002      "host": "cloud_machine_1"
0003      "block_id": "soibxxc9",
0004      "start_end": "end",
0005      "payload": {
0006          (INPUT PARAMETER FOR NEXT PROCESSING BLOCK)
0007      }
0008  }
```

FIG. 24

DATA LIST 453

| AP EXECUTION DEVICE ID 4531 | DATA NAME 4532 | DESCRIPTION 4533 |
|---|---|---|
| 0001 | pic.line-a.jp | IMAGE OF PRODUCTION LINE a |
| 0001 | pic.line-c.ch | IMAGE OF PRODUCTION LINE c |
| 0001 | thermo.line-b.us | TEMPERATURE OF PRODUCTION LINE b |
| ⋯ | ⋯ | ⋯ |
| 0002 | humid.line-d.uk | HUMIDITY OF PRODUCTION LINE d |
| ⋯ | ⋯ | ⋯ |

FIG. 31

DESCRIPTION EXAMPLE OF AP SOFTWARE 7

```
3201  def get_model():
3202      # OBTAIN LEARNING MODEL FROM CLOUD STORAGE
3203      ...
3204      return model
3205
3206  @routing(data=["pic.line-a.jp"])
3207  def anomaly_factor(*args):
3208      # OBTAIN DATA HAVING DATA NAME OF pic.line-a.jp
3209      pic_line_a = db_connector.get(data[0])
3210      # PROCESSING (EXAMPLE: IMAGE PROCESSING) USING pic.line-a.jp
3211      ...
3212      return analysis_results
3213
3214  def update_model(model, factors):
3215      #  UPDATE MODEL
3216      ...
3217      return model
3218
3219  def save_mode():
3220      #  UPDATE MODEL AND SAVE MODEL IN CLOUD STORAGE
3221      ...
3222
3223  def main():
3224      model = get_model()
3225      results = anomaly_factor(model)
3226      save_model(update_model(model, results))
3227
3228  if __name__ == '__main__':
3229      main()
```

FIG. 32

DB COUPLING INFORMATION 154

| DATA NAME (1541) | DB TYPE (1542) | COUPLING DESTINATION (1543) | AUTHENTICATION INFORMATION (1544) | ... |
|---|---|---|---|---|
| pic.line-a.jp | PostgreSQL | 10.0.0.2:5432 | ##### | ... |
| thermo.line-a.jp | PostgreSQL | 10.0.0.2:5432 | ##### | ... |
| humid.line-a.jp | PostgreSQL | 10.0.0.2:5432 | ##### | ... |
| : | : | : | : | ... |
| humid.line-c.jp | MongoDB | 10.0.0.4:27017 | ##### | ... |

FIG. 33

TRANSFER START MESSAGE

```
3701  {
3702    "data": [
3703      "pic.line-a.jp"
3704    ],
3705    "block_id": "rnhawwb8",
3706    "start_end": "start",
3707    "payload": {
3708      (INPUT PARAMETER FOR NEXT PROCESSING BLOCK)
3709    }
3710  }
```

FIG. 37

INFORMATION PROCESSING SYSTEM AND METHOD OF CONTROLLING INFORMATION PROCESSING SYSTEM

TECHNICAL FIELD

The present invention relates to an information processing system and a method of controlling an information processing system.

BACKGROUND ART

The present application claims priority based on Japanese Patent Application No. 2019-099564 filed on May 28, 2019, and Japanese Patent Application No. 2019-165080 filed on Sep. 11, 2019, and the entire disclosure of the above applications is incorporated herein by reference.

PTL 1 discloses that, in a system in which multiple edge devices such as personal computers, cellphones, smartphones, and portable information terminals are each communicably coupled with a cloud through a network, an application that executes processing in real-time between the cloud and the edge devices provides services such as notifications or recommendations based on real-time feeds collected from the edge devices and the cloud.

PTL 2 discloses a cloud relay device that is formed for the purpose of enabling improvement in easy development of an application and flexible use of various cloud services from the application in a device on an edge side using a cloud service. The cloud relay device includes a cloud coupling processing unit capable of being coupled with a cloud service device, a user interface unit corresponding to the cloud coupling processing unit, and a relay unit that relays data between the cloud coupling processing unit and the user interface unit.

CITATION LIST

Patent Literature

[PTL 1] Published Japanese Translation of PCT International Application No. 2015-505404
[PTL 2] Japanese Patent Application Publication No. 2018-92565

SUMMARY OF INVENTION

Technical Problem

So-called edge computing, which executes processing and the like that should be executed with low latency on an edge side and executes management and the like of the contents processed on the edge side on a cloud side, has been receiving attention. Additionally, opportunities of developing software for implementing processing that is executed between multiple hubs like the edge computing have been increasing. Moreover, software that coordinates processing of applications provided on the cloud side and the edge side by using APIs (Application Program Interfaces) opened by the applications of the cloud and the edge has been receiving attention.

The development of such software coordinating processing between multiple hubs requires a reduction in communication load between the hubs, an improvement in security, a reduction in development load of the software, and the like.

Additionally, the method of developing software has been shifting from a conventional development method centered on data management (SoR: System of Record) to a development method centered on clients (SoE: system of Engagement), and it has been important for the software development to involve a system ordering side (domain expert) who is conversant with the situation of a domain side (edge side).

In PTL 1, the configuration requires each edge device to communicate with the cloud individually; thus, there is need of software individually constructed for the cloud and each edge device, which makes the development load of the overall system large and makes it difficult particularly for a domain expert who is not proficient at the processing of coordinating with the cloud to achieve the development. Additionally, since communications occur between each edge device and the cloud, the communication load and an assurance of security between the cloud and the edge devices are problematic.

On the other hand, the configuration disclosed in PTL 2 requires development of software that implements the function of the cloud relay device on the edge side; thus, there is need of software individually developed for the cloud relay device in each hub, which makes the development load large, and it is particularly difficult for a domain expert to develop the software that implements the processing of coordinating the cloud relay device and the cloud.

The present invention is made in view of the above-described background, and an object of the present invention is to provide an information processing system and a method of controlling an information processing system that are capable of efficiently developing software that implements processing executed through coordination between multiple hubs.

Solution to Problem

An aspect of the present invention to achieve the above objective is an information processing system, comprising a plurality of AP execution devices that are information processing apparatuses provided in each of a plurality of hubs to execute AP software that is software implementing a function of an application, wherein the AP execution devices are communicably coupled to each other through a communication network, each of the AP execution devices stores common AP software that executes the same processing blocks in the same order, the AP software includes transfer processing blocks that are processing blocks implementing processing to coordinate processing of the processing blocks executed by a first one of the AP execution devices in a first one of the hubs with a second one of the AP execution devices in a second one of the hubs, once the processing reaches a first one of the transfer processing blocks during sequential execution of the processing blocks of the AP software, the first AP execution device transmits a coordination start message that is a message notifying of start of the coordination, to the second AP execution device, and once the second AP execution device receives the coordination start message, the second AP execution device starts sequential execution from a processing block following the first transfer processing block.

Additionally, problems disclosed in the present application and solutions thereof are apparent in the column of modes for carrying out the invention and drawings.

Advantageous Effects of Invention

According to the present invention, it is possible to efficiently develop software that implements processing executed through coordination between multiple hubs.

BRIEF DESCRIPTION OF DRAWINGS

FIG. 22 is an example of a transfer start message.

FIG. 23 is an example of a coordination start message.

FIG. 24 is an example of a coordination end message.

FIG. 31 is an example of a data list managed by the cluster management device.

FIG. 32 is a description example of the AP software in the third embodiment.

FIG. 33 is an example of DB coupling information.

FIG. 37 is an example of a transfer start message in the third embodiment.

DESCRIPTION OF EMBODIMENTS

Hereinafter, embodiments are described with reference to the drawings. In the following descriptions, the same or similar configurations may be marked with the same reference signs to omit the duplicated descriptions. Additionally, "application software" may be written as "AP". Moreover, "database" may be written as "DB". Furthermore, in the following descriptions, when similar types of configurations need to be distinguished from each other, an identifier (a number, an alphabet, or the like) may be written in parentheses after the reference sign collectively referring to the configurations.

First Embodiment

Figure 1:
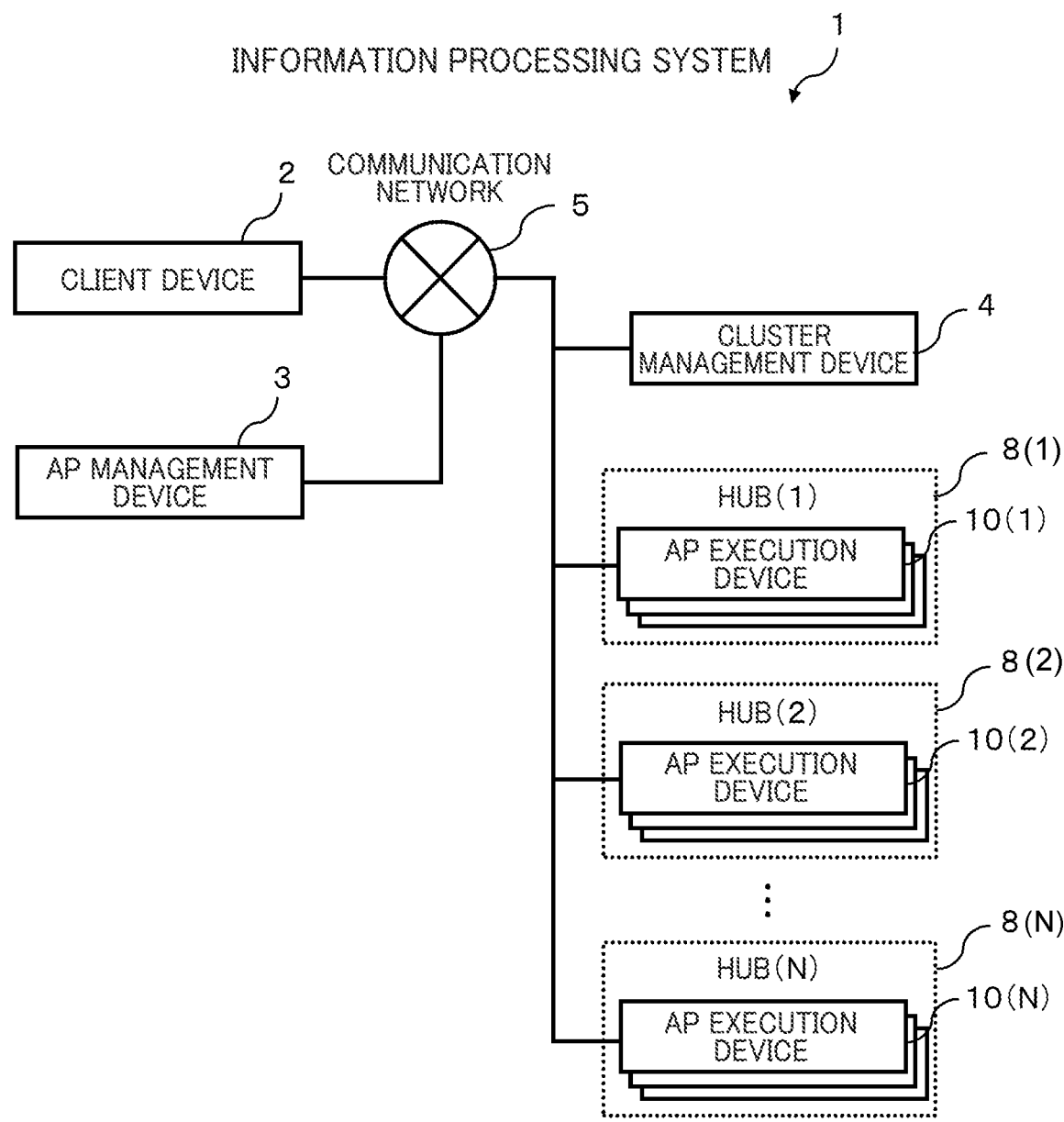
FIG. 1 is a diagram illustrating a schematic configuration of an information processing system.

FIG. 1 illustrates a schematic configuration of an information processing system 1 that is described as a first embodiment. As illustrated in FIG. 1, the information processing system 1 includes a client device 2, an AP management device 3, a cluster management device 4, and one or more AP execution devices 10 existing in each of multiple hubs 8(1) to (N). All these devices are formed by using an information processing apparatus (a computer) and are communicably coupled to each other through a communication network 5.

The communication network 5 is a communication infrastructure (Network Infrastructure) that implements communications according to a predetermined communication protocol such as Ethernet (registered trademark) and TCP/IP and is, for example, a LAN (Local Area Network), a WAN (Wide Area Network), the Internet, a leased line, a public communication network, or the like.

The client device 2 provides a user such as a software development engineer and a domain expert with an environment of editing and generating (hereinafter, referred to as a "software development environment") for application software (hereinafter, referred to as "AP software") executed by the AP execution device 10. It should be noted that, although the client device 2 provides a software development environment using a visual programming tool (hereinafter, abbreviated as a "VP tool") as an example in this embodiment, the aspect of the software development environment is not necessarily limited.

In the software development using the VP tool, information corresponding to usage, environment, and other situations is set as property values to nodes expressing various types of processing, and the nodes are coupled with each other by lines to write a sequence of processing steps as a flow. The nodes correspond to functions or methods in a general procedural programming language. The user can intuitively develop software that executes intended processing by using the VP tool. Node-RED is an example of the VP tool. A sequence of flows developed by Node-RED is managed by a code in the JSON (JavaScript Object Notation) format based on JavaScript (registered trademark). Additionally, Apache Nifi and the like are other examples of the VP tool.

In FIG. 1, the AP management device 3 manages (stores) the AP software generated by the client device 2. For example, when the AP software is generated by Node-RED, the AP management device 3 manages a code in the JSON format of the AP software. The AP software may be managed by the AP management device 3 as a container (a package of an AP software execution module, information on the execution environment, information on a deployment method or an operation method, and the like). The one formed by Docker (registered trademark) is an example of the container. The AP management device 3 may include a system (such as GitHub (registered trademark) or GitLab (registered trademark)) for managing versions of the AP software.

The hubs 8(1) to (N) are, for example, the cloud, fields in which collection and the like of sensor data are performed (factories, various workplaces, distribution warehouses, offices, various facilities (elevators, automatic ticket gates, various gates, rail facilities, road facilities, environmental measuring facilities using sensors, mobile objects (automobiles, trains, aircrafts, drones, agricultural equipment, and the like), farms, data centers, and so on).

The cluster management device 4 performs execution control and monitoring of processing in the AP execution devices 10 and provides (manages, monitors, controls) a cluster service (load distribution, failover, and the like) using the multiple AP execution devices 10. In this specification, a cluster indicates an aggregate of the AP execution devices 10 that can execute the processing of the AP software through coordination. Additionally, the cluster management device 4 manages one or more clusters and, for example, executes processing related to registration (participation) and registration cancellation of the AP execution devices 10 to the clusters. Moreover, the cluster management device 4 distributes information (the AP software, later-described AP execution device information, and the like) to the AP execution devices 10 and shares information (information on the AP execution devices 10 participating in the clusters (a list of the participating AP execution devices 10, later-described AP execution device information, and the like)) between the AP execution devices 10. The cluster management device 4 implements the cluster service not only between the AP execution devices 10 in the same hub 8 but also between the AP execution devices 10 beyond the hub 8.

The one or more AP execution devices 10 exist in each of the hubs 8(1) to (N). The AP execution devices 10 existing in each of the hubs 8(1) to (N) can execute the AP software in coordination with the other AP execution devices 10 in the same or different hub 8 belonging to the same cluster.

Figure 2:
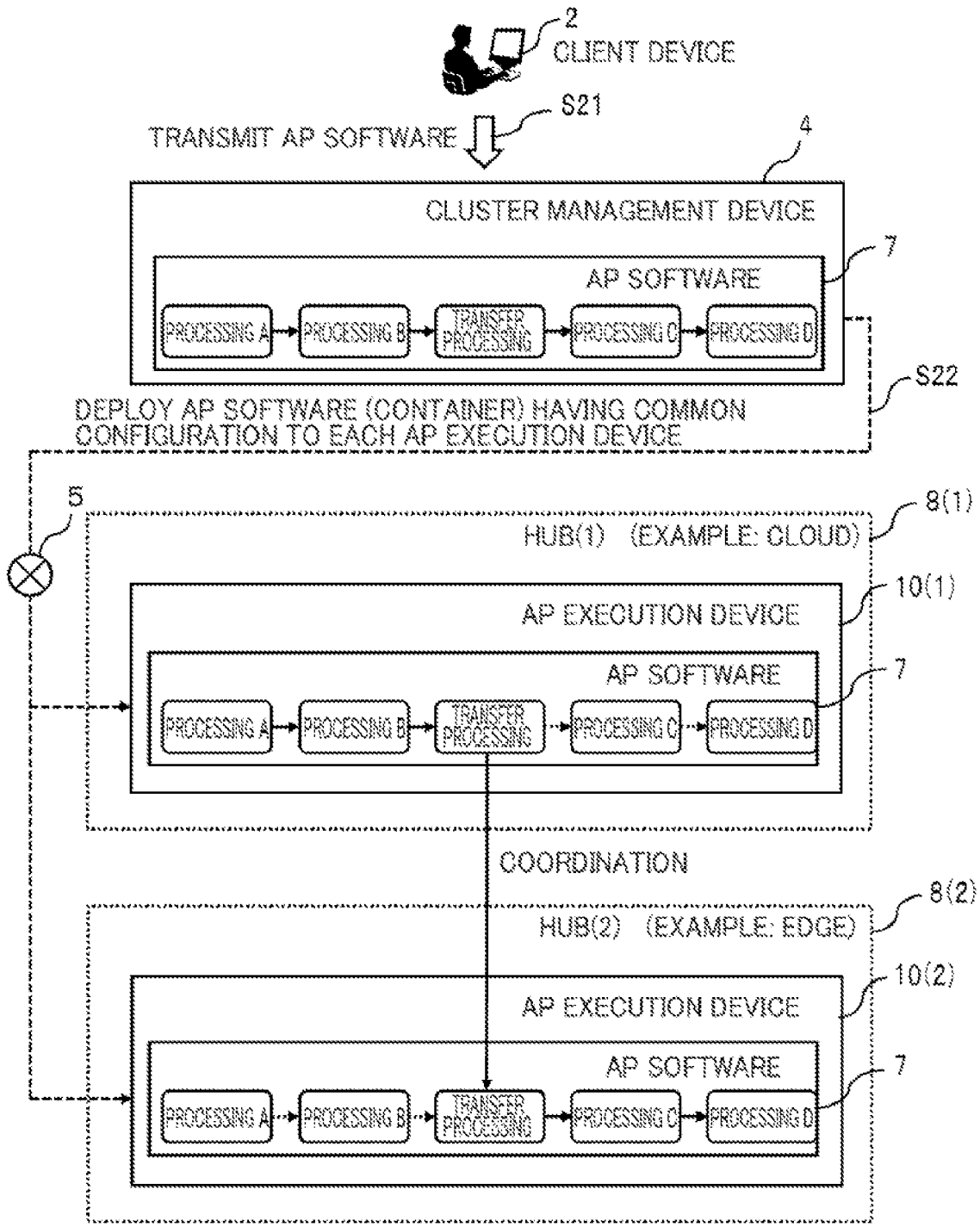
FIG. 2 is a diagram describing a schematic procedure from generation to execution of AP software.

FIG. 2 is a diagram illustrating a schematic flow from when the AP software generated by the client device 2 is provided (deployed) to the AP execution devices 10 to when each AP execution device 10 executes the AP software.

As illustrated in FIG. 2, AP software 7 generated by the client device 2 is registered into the AP management device 3 and is also provided (transmitted) to the cluster management device 4 (S21). The illustrated AP software 7 includes five processing blocks ("processing A", "processing B", "transfer processing", "processing C", and "processing D") that are executed in sequence. Each processing block corresponds to, for example, a single processing block in the VP tool or a function or a method in a general procedural programming language. The processing block may call and use other software (for example, software provided as an API (Application Program Interface)) already existing in the AP execution device 10. The "processing A" and the "processing B" are processing blocks that are planned to be executed in the hub 8(1), while the "processing C" and the "processing D" are processing blocks that are planned to be executed in the hub 8(2).

Subsequently, the cluster management device 4 deploys the AP software 7 having a common (same) configuration to the multiple AP execution devices 10 belonging to the same cluster (S22). In this example, the cluster management device 4 manages the AP execution devices 10(1) in the hub 8(1) and the AP execution devices 10(2) in the hub 8(2) as the AP execution devices 10 belonging to the common cluster and deploys the common AP software 7 to the AP execution devices 10(1) in the hub 8(1) and the AP execution devices 10(2) in the hub 8(2).

Processing of the AP software deployed to the AP execution devices 10 is started with, for example, the cluster management device 4 transmitting a command to start executing the AP software 7 to one of the AP execution devices 10(1). In this example, the execution start command is transmitted from the cluster management device 4 to the AP execution device 10(1) in the hub 8(1), and the AP execution device 10(1) starts executing the AP software (start the execution from the "processing A").

Once the "processing A" ends, the AP execution device 10(1) executes the "processing B" subsequently and executes the "transfer processing" subsequently. The "transfer processing" is processing to perform coordination (passing) of the processing with another AP execution device 10. In this example, the coordination of the processing is made with the AP execution device 10(2) in the hub 8(2), a processing result of the "processing B" is passed to the "transfer processing" by the AP execution device 10(2), and processing of the "transfer processing" by the AP execution device 10(2) is started from the following "processing C".

Figure 3:
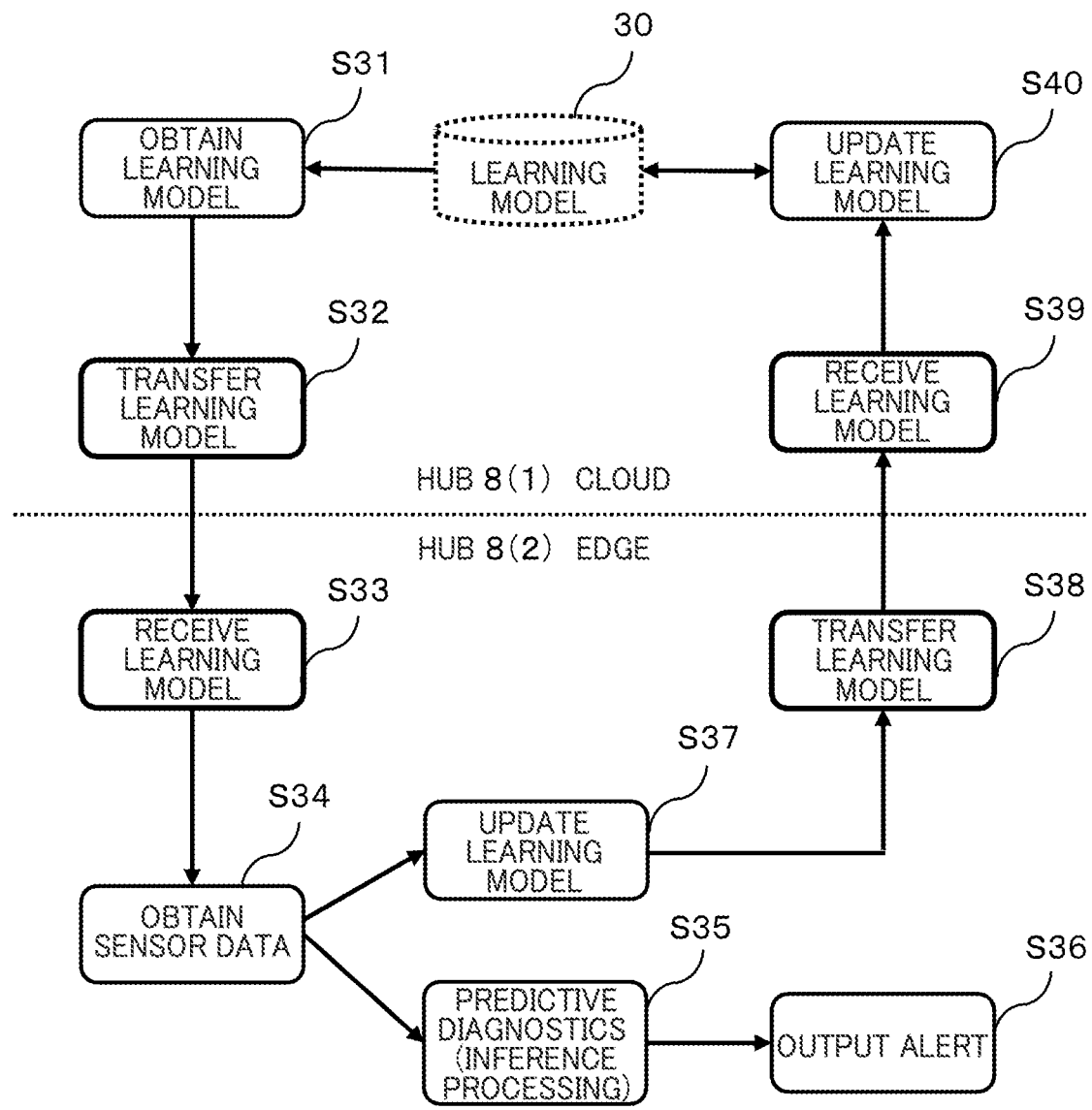
FIG. 3 is a diagram illustrating a specific example of the AP software.

FIG. 3 illustrates a specific example of the AP software 7. The illustrated AP software 7 is software that implements a function of predictive diagnostics using a machine learning model (hereinafter, referred to as a "learning model") by the edge computing.

As illustrated in FIG. 3, the AP execution device 10(1) in the hub 8(1) as the cloud manages (stores) one or more learning models 30 that are used by the AP execution device 10(2) in the hub 8(2) as the edge for the predictive diagnostics.

First, the AP execution device 10(1) obtains the learning model that is to be provided to the AP execution device 10(2) in the hub 8(2) as the edge (S31) and transfers the obtained learning model to the AP execution device 10 in the hub 8(2) (S32). The processing in S32 corresponds to the above-described "transfer processing".

The AP execution device 10(2) in the hub 8(2) receives and stores the learning model (S33). Subsequently, the AP execution device 10(2) obtains sensor data (S34), applies the obtained sensor data to the stored learning model to perform the predictive diagnostics (S35), and executes processing (output of an alert or the like) according to the result of the predictive diagnostics (S36).

On the other hand, the AP execution device 10(2) updates the learning model by performing machine learning using the obtained sensor data as learning data (S37) and transfers the updated learning model to the AP execution device 10(1) in the hub 8(1) (S38). S33 and S38 correspond to the above-described "transfer processing".

The AP execution device 10(1) in the cloud receives the learning model (S39) and updates the managing (storing)

learning model 30 to the contents of the received learning model (S40). The processing in S39 corresponds to the above-described "transfer processing".

As described above, the AP software 7 having the common (same) configuration is provided (deployed) to each of the multiple AP execution devices 10 that execute the processing through coordination. Thus, there is no need to construct different AP software 7 for each AP execution device 10, and the AP software 7 may be, for example, constructed by a specific developer who is conversant with the processing between the cloud and the hubs 8. Consequently, there is no need for the domain experts of the corresponding hubs 8 to construct the AP software 7 individually, and it is possible to efficiently develop the software that executes the processing through coordination between the multiple hubs 8 in the overall information processing system 1.

Additionally, the common (same) AP software 7 is provided (deployed) to all the multiple AP execution devices 10. Thus, management (maintenance) load and operation load of the AP software 7 may be less. Moreover, in principle, communications between the AP execution devices 10 occur only in the transfer processing; thus, it is possible to reduce communication load in the overall information processing system 1, and since only a specific processing block (the transfer processing) needs to be focused and monitored, it is possible to improve the security.

Figure 4:
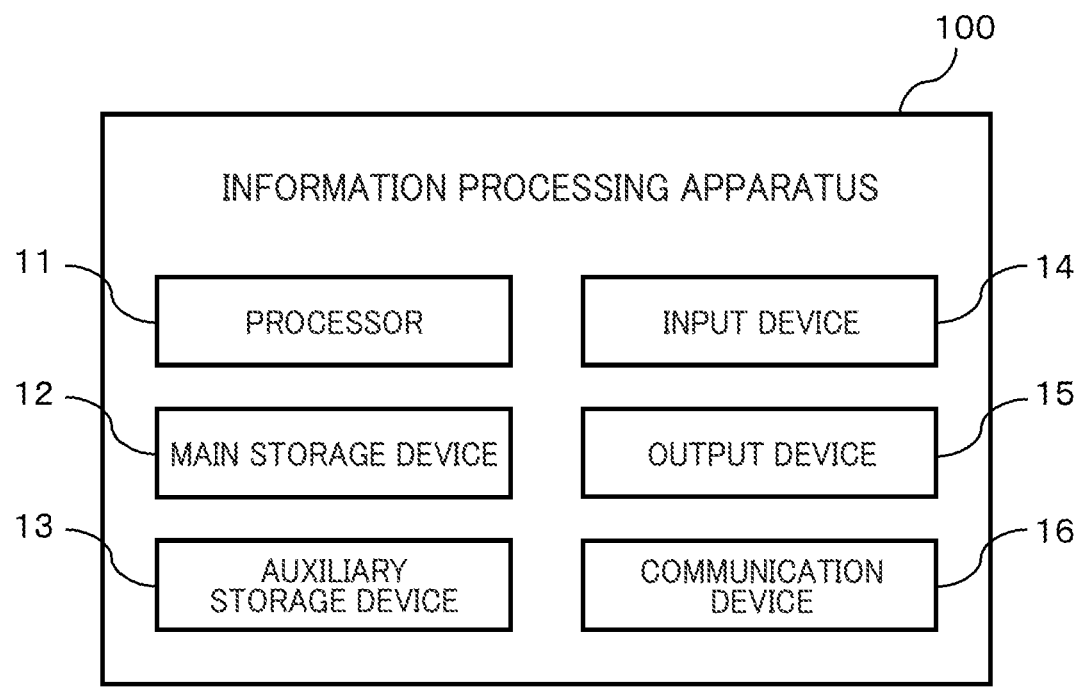
FIG. 4 is a configuration example of an information processing apparatus.

FIG. 4 illustrates an example of hardware of an information processing apparatus 100 that is used to implement the above-described client device 2, AP management device 3, cluster management device 4, and AP execution device 10. As illustrated in FIG. 4, the illustrated information processing apparatus 100 includes a processor 11, a main storage device 12, an auxiliary storage device 13, an input device 14, an output device 15, and a communication device 16.

The client device 2, the AP management device 3, the cluster management device 4, and the AP execution device 10 may be, for example, implemented by using a virtual information processing resource like a Cloud Server provided by a Cloud System. Additionally, for example, the client device 2, the AP management device 3, the cluster management device 4, and the AP execution device 10 may be implemented by multiple information processing apparatuses 100 that operate in cooperation with each other. Moreover, for example, two or more of the client device 2, the AP management device 3, the cluster management device 4, and the AP execution device 10 may be implemented by a common information processing apparatus 100.

The processor 11 is formed by using, for example, a CPU (Central Processing Unit), an MPU (Micro Processing Unit), a GPU (Graphics Processing Unit), or the like. The main storage device 12 is a device that stores a program and data and is, for example, a ROM (Read Only Memory) (an SRAM (Static Random Access Memory), an NVRAM (Non Volatile RAM), a mask ROM (Mask Read Only Memory), a PROM (Programmable ROM) or the like), a RAM (Random Access Memory) (a DRAM (Dynamic Random Access Memory) or the like), or the like. The auxiliary storage device 13 is a Hard Disk Drive, a Flash Memory, an SSD (Solid State Drive), an optical storage device (a CD (Compact Disc), a DVD (Digital Versatile Disc), or the like), or the like. A program and data stored in the auxiliary storage device 13 is read by the main storage device 12 as needed.

The input device 14 is a user interface that accepts information from the user and is, for example, a keyboard, a mouse, a card reader, a touch panel, or the like. The output device 15 is a user interface that provides the user with information by outputting (display output, audio output, print output, or the like) the information and is, for example, a display device (an LCD (Liquid Crystal Display), a graphic card, or the like), an audio output device (a speaker), a print device, or the like that visualizes various pieces of information. The communication device 16 is a communication interface that communicates with another device through the communication network 5 and is, for example, an NIC (Network Interface Card), a wireless communication module, a USB (Universal Serial Interface) module, a serial communication module, or the like. The communication device 16 can be functioned as an input device that receives information from another device to which the communication device 16 communicably couples. Additionally, the communication device 16 also can be functioned as an output device that transmits information to another device to which the communication device 16 communicably couples.

Functions of the client device 2, the AP management device 3, the cluster management device 4, and the AP execution device 10 are implemented with the processor 11 reading and executing the program stored in the main storage device 12. Additionally, the above-described program may be, for example, recorded in a recording medium to be distributed.

In addition to the above-described functions, the client device 2, the AP management device 3, the cluster management device 4, and the AP execution device 10 may further include, for example, other functions such as an operating system, a file system, a device driver, a DBMS (DataBase Management System), and the like. The client device 2, the AP management device 3, the cluster management device 4, and the AP execution device 10 store various pieces of information (data) as, for example, a table of database or a file.

Figure 5:
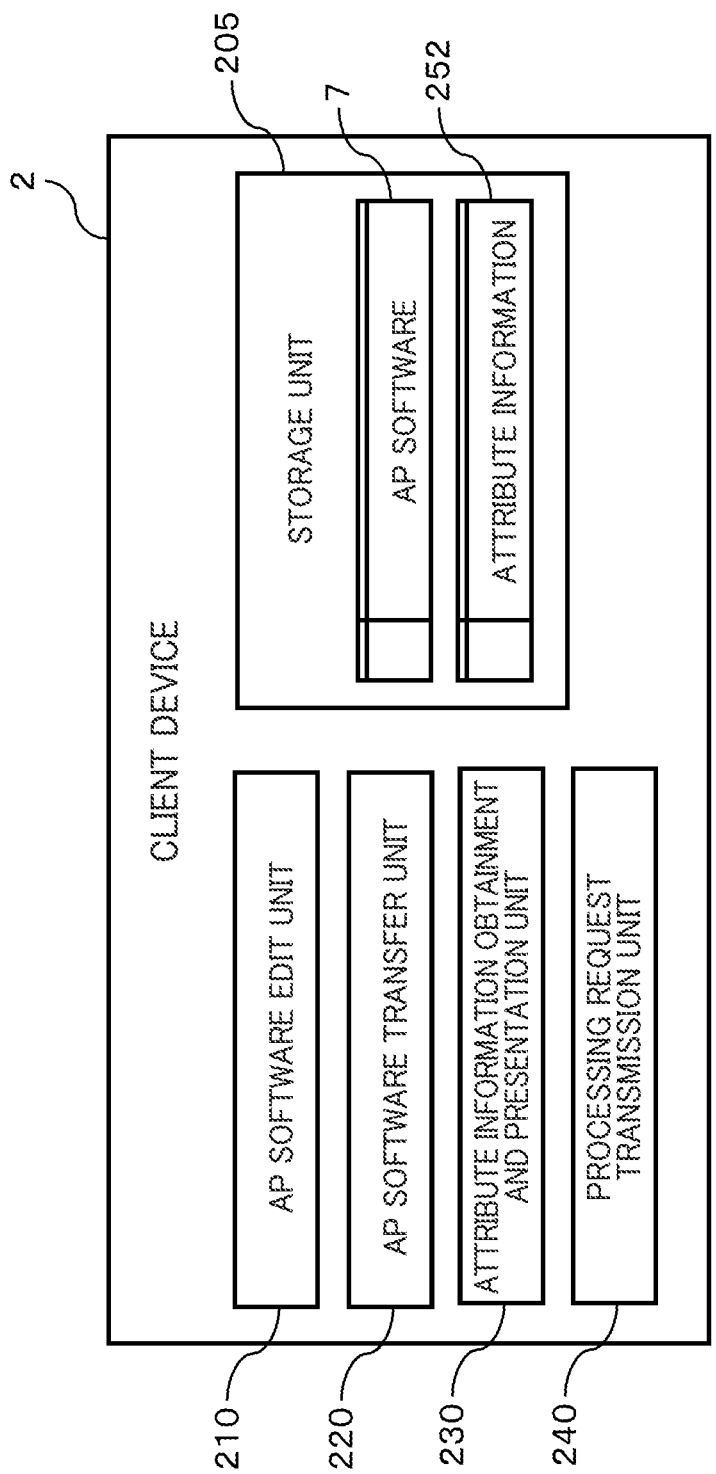
FIG. 5 is a diagram describing main functions of a client device.

FIG. 5 illustrates main functions that the client device 2 has. As illustrated in FIG. 5, the client device 2 has functions of a storage unit 205, an AP software edit unit 210, an AP software transfer unit 220, an attribute information obtainment and presentation unit 230, and a processing request transmission unit 240. It should be noted that, the client device 2 is operated by the user such as the software development engineer, the domain expert, a manager of the cluster, and the like.

Among the above-described functions, the storage unit 205 stores the AP software 7 and attribute information 252.

The AP software edit unit 210 provides the user with a development environment for the AP software 7 using the VP tool and generates the AP software 7.

The AP software transfer unit 220 transfers the AP software 7 generated by the AP software edit unit 210 to the AP management device 3 and the cluster management device 4.

The attribute information obtainment and presentation unit 230 transmits a later-described request for obtaining attribute information to the cluster management device 4 and receives the attribute information transmitted from the cluster management device 4 to present the attribute information to the user. The attribute information is described later.

The processing request transmission unit 240 transmits a processing request such as an instruction to generate a later-described AP process 800 and an instruction to start executing the AP software 7 to the cluster management device 4.

Figure 6:
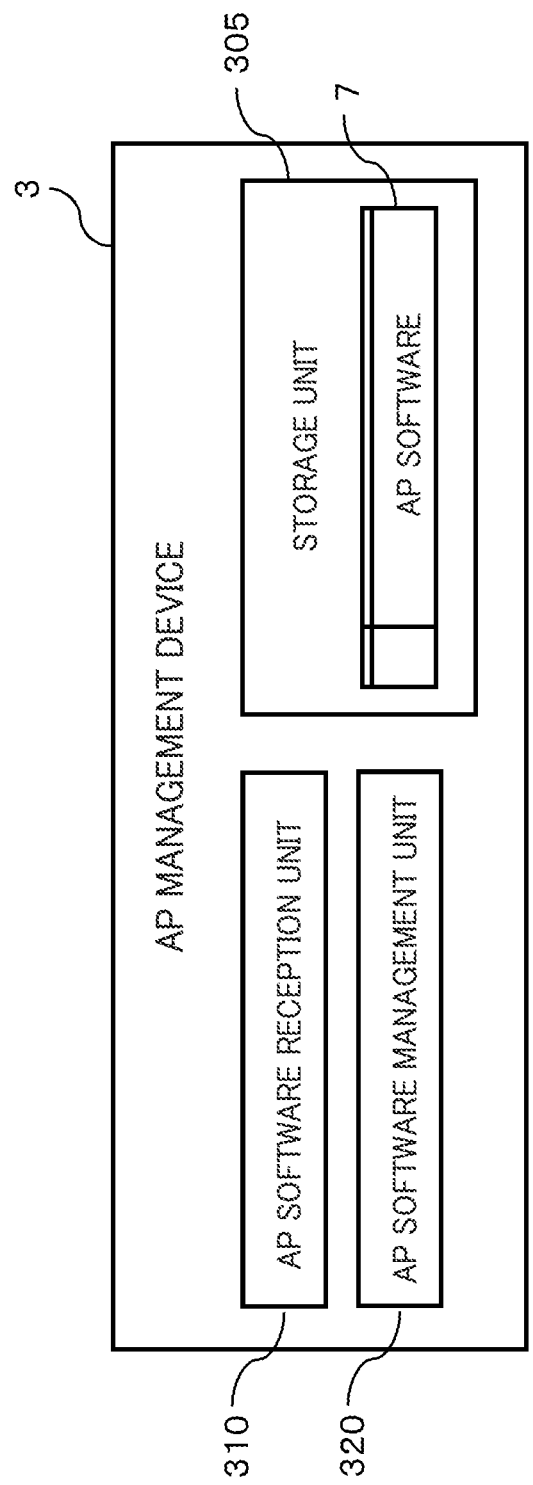
FIG. 6 is a diagram describing main functions of an AP management device.

FIG. 6 illustrates main functions that the AP management device 3 has. As illustrated in FIG. 6, the AP management device 3 includes a storage unit 305, an AP software reception unit 310, and an AP software management unit 320.

The AP software reception unit 310 receives the AP software 7 transmitted from the client device 2 through the communication network 5. The AP software received by the AP software reception unit 310 is stored in the storage unit 305. The AP software management unit 320 manages versions of the AP software 7.

Figure 7:
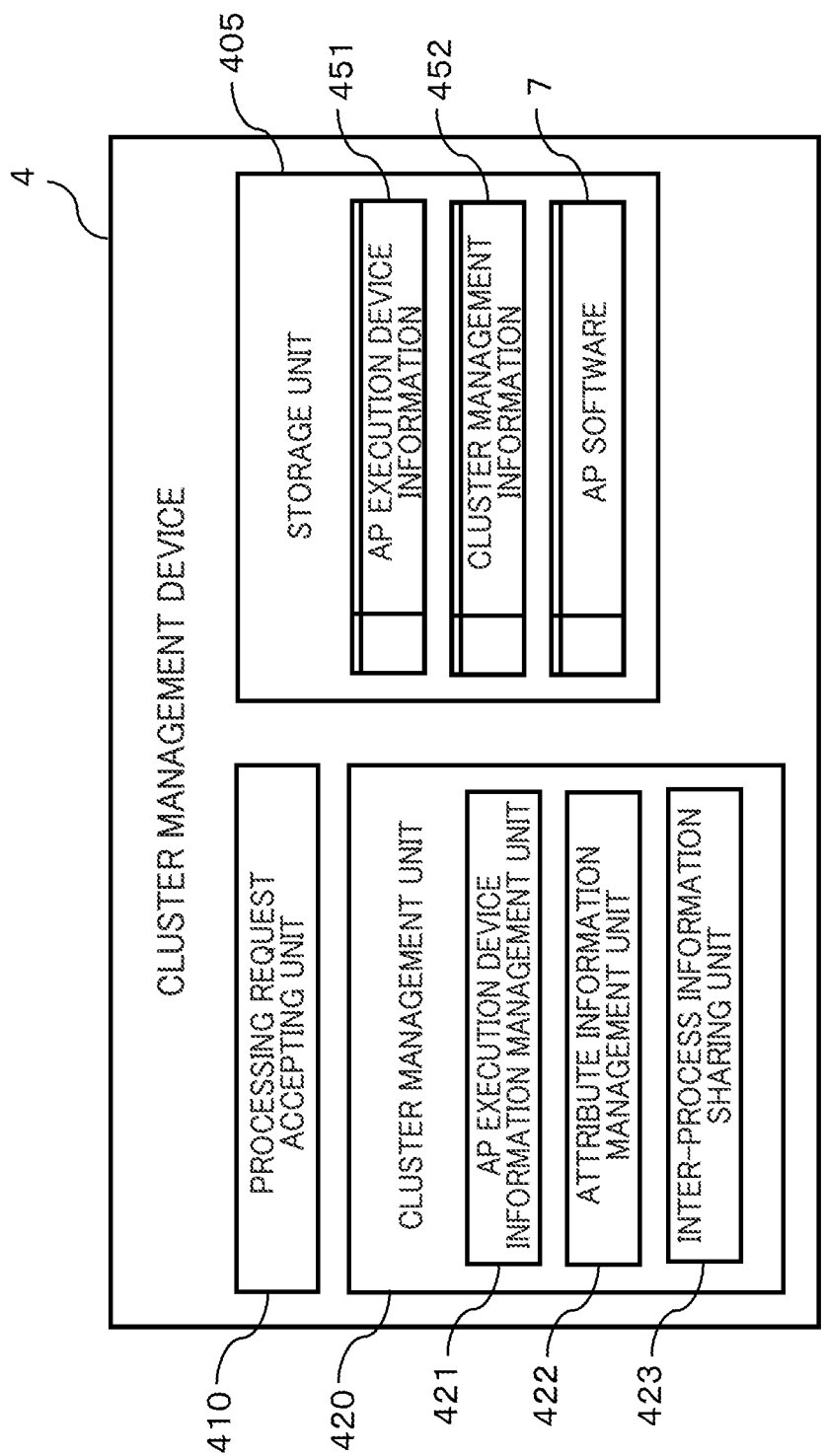
FIG. 7 is a diagram describing main functions of a cluster management device.

FIG. 7 illustrates main functions that the cluster management device 4 has. As illustrated in FIG. 7, the cluster management device 4 includes a storage unit 405, a processing request accepting unit 410, and a cluster management unit 420.

The storage unit 405 stores AP execution device information 451, cluster management information 452, and the AP software 7. The AP execution device information 451 includes various pieces of information on the AP execution device 10. The cluster management information 452 includes information on the configuration of the cluster and the operation state of the cluster. The contents of the cluster management information 452 are managed by the cluster management unit 420 and an inter-process information sharing unit 423.

The processing request accepting unit 410 accepts a request for executing processing (the request for providing the attribute information, the request for starting the execution of the AP software 7, a request for performing setting (registration/changing/deletion) of the AP software 7 and the AP execution device information 451, and the like) from the client device 2. Thus, the cluster management device 4 functions also as a user interface (a connection with the user) that accepts a request from the user.

The cluster management unit 420 includes an AP execution device information management unit 421, an attribute information management unit 422, and the inter-process information sharing unit 423.

Among the above, the AP execution device information management unit 421 manages information on a process (a process generated by executing the AP software 7; hereinafter, referred to as an "AP process") that is generated in the AP execution device 10, out of the information on the AP execution device 10 included in the cluster. The above-described information is, for example, a network address (an IP address or the like) of the AP execution device 10 in which the AP process is operated, a port number for communicating with the AP process, or the like.

The attribute information management unit 422 manages information (hereinafter, referred to as the "attribute information") required to identify the AP execution device 10 as a transfer destination when the AP process executes the above-described "transfer processing". Details of the attribute information are described later.

The inter-process information sharing unit 423 executes processing related to the information sharing between the AP processes generated in the AP execution devices 10. The inter-process information sharing unit 423 manages (stores) information (the AP software 7, the later-described AP execution device information, and the like) that should be shared between the AP execution devices 10 included in the cluster and between the AP processes, and implements the high-speed (real-time) sharing (distribution, notification) of the 10 above-described information between the AP execution devices and between the AP processes through the communication network 5. Additionally, the inter-process information sharing unit 423 receives a request for registering the participation in a cluster that is transmitted from the AP process and updates the cluster management information 452 (updates the contents to indicate that the above-described AP process belongs to a predetermined cluster).

Moreover, the inter-process information sharing unit 423 monitors a later-described existence notification (heartbeat) transmitted from the AP process 800 of the AP execution device 10 to figure out whether the AP process 800 is normally functioning in real-time.

The inter-process information sharing unit 423 may be implemented by, for example, a distributed processing system formed by communicably coupling the information processing apparatuses existing in the hubs 8(1) to (N) on the edge side. This makes it possible to prevent a concentration of load to a specific information processing apparatus such as the cluster management device 4 and also to speed up the processing in the hubs 8(1) to (N). The above-described distributed processing system can be implemented by using, for example, ZooKeeper provided by Apache Software Foundation.

Figure 8:
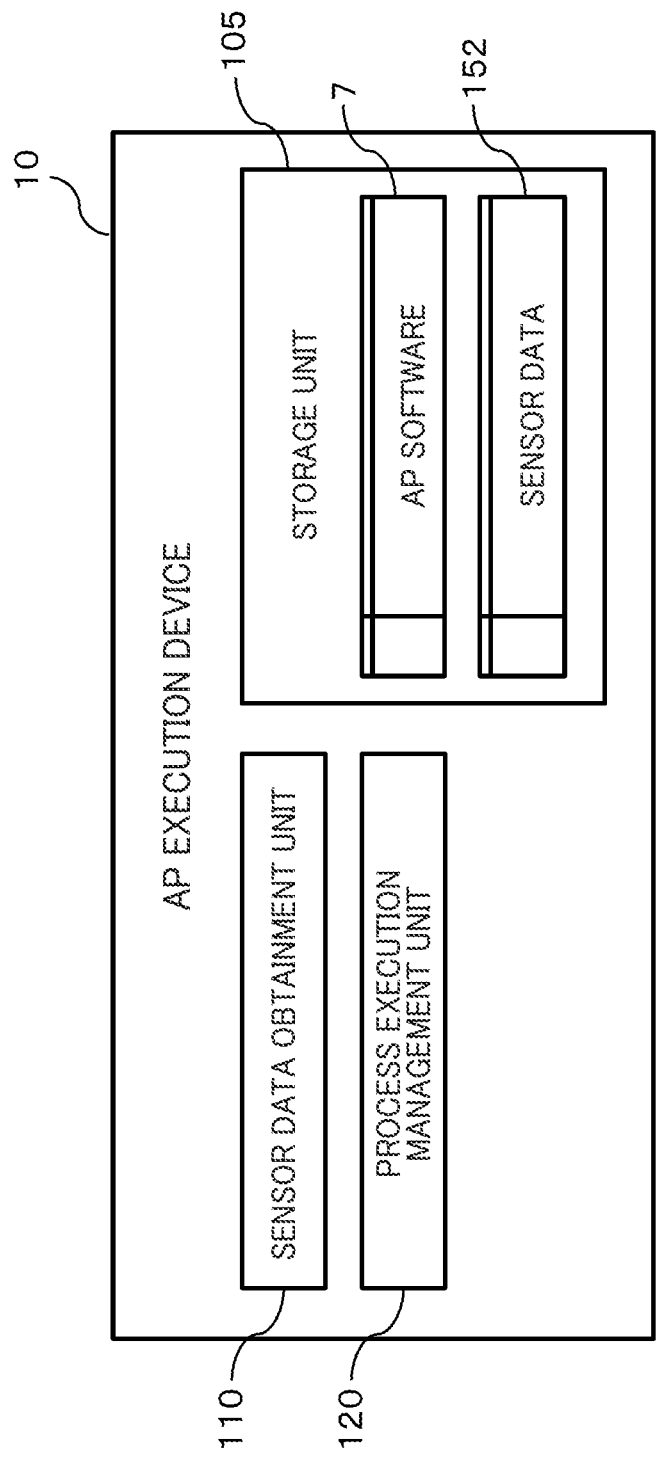
FIG. 8 is a diagram describing main functions of an AP execution device.

FIG. 8 illustrates main functions that the AP execution device 10 has. As illustrated in FIG. 8, the AP execution device 10 includes a storage unit 105, a sensor data obtainment unit 110, and a process execution management unit 120.

The sensor data obtainment unit 110 receives the sensor data transmitted from a sensor device or the like provided in the hub 8 in which the AP execution device 10 exists. The sensor data received by the sensor data obtainment unit 110 is stored in the storage unit 105 as sensor data 152. It should be noted that, although such a case where data to be processed by the AP execution device 10 (the AP process 800) is the sensor data is described hereinafter as an example, the type of the data to be processed by the AP execution device 10 (the AP process 800) is not necessarily limited, and the data to be processed by the AP execution device 10 (the AP process 800) may be data other than the sensor data.

The process execution management unit 120 manages (generates and makes disappear the AP process and monitors the state of the AP process, for example) the AP process 800 (a process of a Docker (registered trademark) container or the like).

Figure 9:
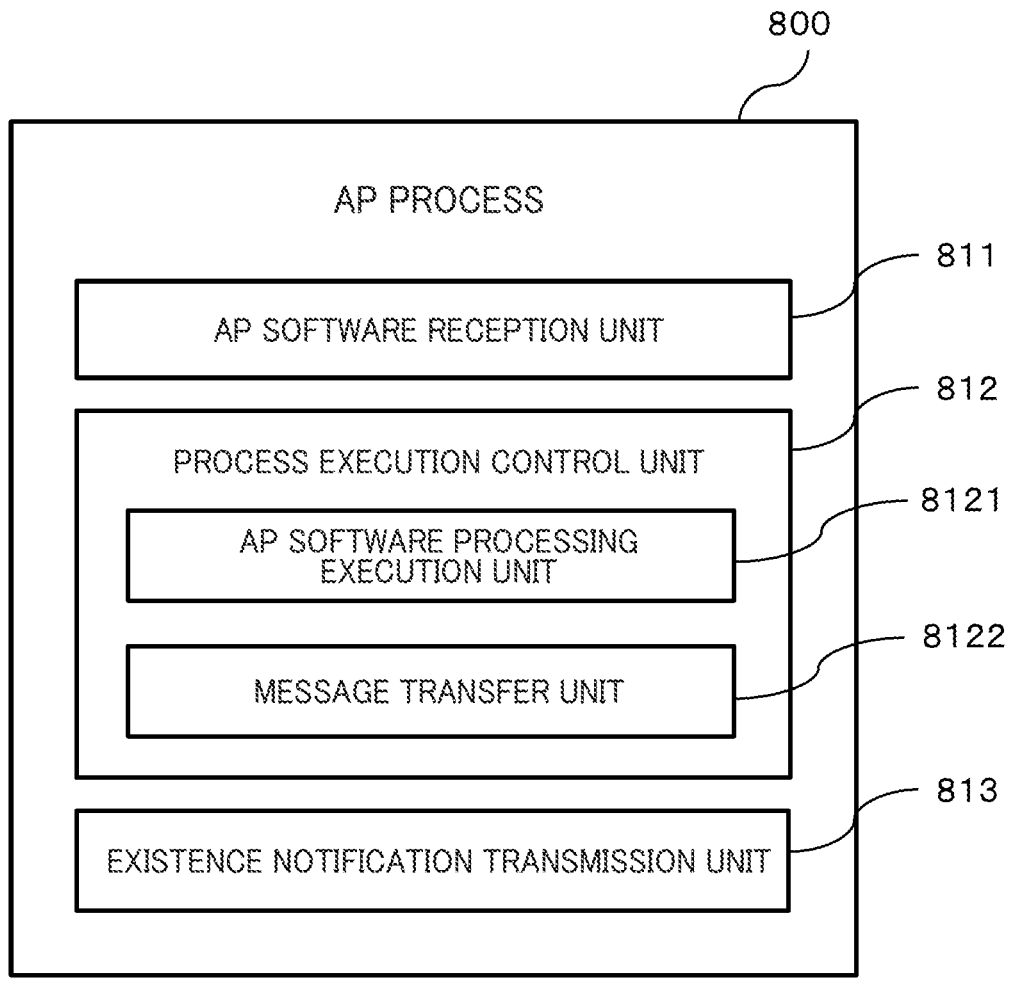
FIG. 9 is a diagram describing main functions implemented by an AP process.

FIG. 9 schematically illustrates main functions that are implemented by the AP process 800 generated by the AP execution device 10. As illustrated in FIG. 9, the AP process 800 includes an AP software reception unit 811, a process execution control unit 812, and an existence notification transmission unit 813. A part of these functions may be implemented by an operating system or the process execution management unit 120 included in the AP execution device 10.

The AP software reception unit 811 receives the AP software 7 from the inter-process information sharing unit 423 of the cluster management device 4. The storage unit 105 stores the AP software 7 received by the AP software reception unit 811. In this way, the AP software 7 is deployed to the AP execution device 10 (the AP process 800).

The process execution control unit 812 provides an execution environment for the AP software 7. For example, when the AP software 7 is generated by Node-RED, the process execution control unit 812 provides an execution environment for Node-RED to execute the AP software 7. Additionally, the process execution control unit 812 controls the execution of the AP software 7.

The process execution control unit 812 includes an AP software processing execution unit 8121 and a message transfer unit 8122. Among the above, the AP software processing execution unit 8121 performs the flow control (a sequential execution control of the processing blocks) of the AP software 7. During the above-described "transfer processing", the message transfer unit 8122 transmits or receives the information (hereinafter, referred to as a "message") required for coordination (passing) of the processing between the AP processes 800 to or from another AP process 800.

The existence notification transmission unit 813 transmits and receives the existence notification (heartbeat) to and from the inter-process information sharing unit 423 as needed (for example, regularly).

<Description of Processing>

Subsequently, various types of processing executed in the information processing system 1 are described in sequence.

Figure 10:
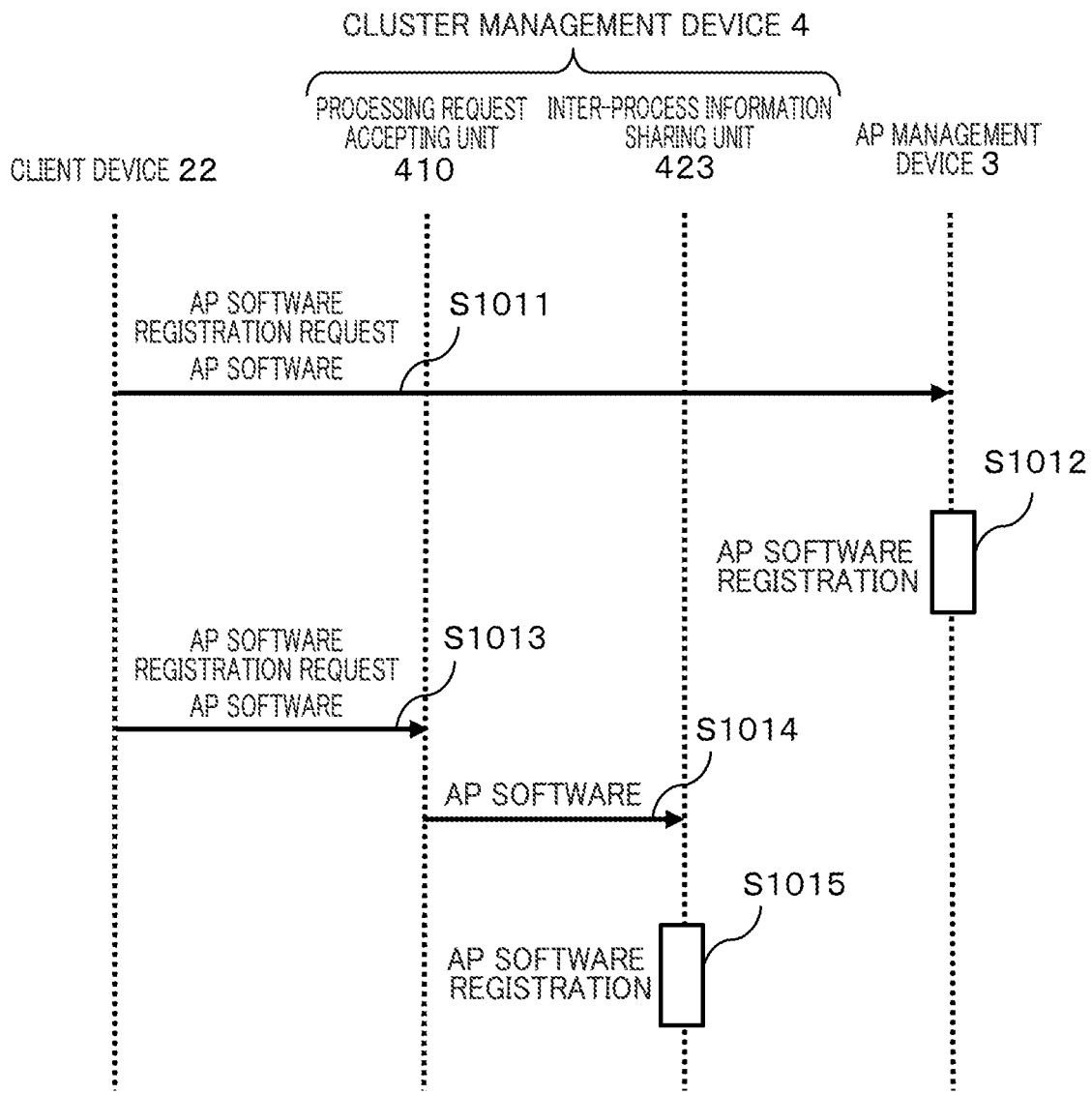
FIG. 10 is a diagram describing an AP software registration sequence.

FIG. 10 is a sequence diagram describing processing (hereinafter, referred to as an AP software registration sequence S1000) that is executed when the AP software 7 is registered (stored) from the client device 2 into the AP management device 3 and the cluster management device 4.

First, the client device 2 transmits the AP software 7 and the request for registering the AP software 7 to the AP management device 3 (S1011). Once receiving the above-described registration request from the client device 2, the AP management device 3 registers (stores) the AP software 7, which is received with the above-described registration request, as a management target (S1012).

Additionally, the client device 2 transmits the AP software 7 to the cluster management device 4. The processing request accepting unit 410 of the cluster management device 4 receives the above-described AP software 7 transmitted from the client device 2 (S1013).

The processing request accepting unit 410 of the cluster management device 4 transmits the received AP software 7 to the own inter-process information sharing unit 423 (S1014). The inter-process information sharing unit 423 receives the AP software 7 and registers (stores) the AP software 7 as a management target (S1015).

It should be noted that, as another processing order, after receiving the AP software 7, the processing request accepting unit 410 may transmit the AP software 7 to the AP management device 3 in addition to the inter-process information sharing unit 423 such that the AP management device 3 registers the AP software 7. In a case of this processing order, it is possible to limit the number of times of transmitting the AP software registration request by the client device 2 to one.

Figure 11:
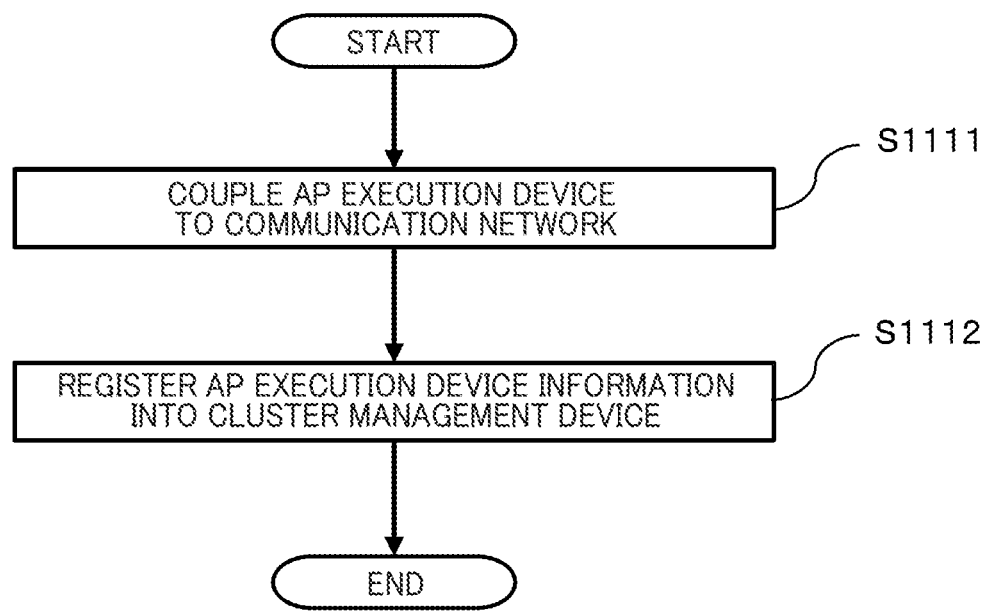
FIG. 11 is a flowchart describing steps of adding a new AP execution device to a cluster.

FIG. 11 is a flowchart describing steps of adding a new AP execution device 10 to the cluster managed by the cluster management device 4.

First, the manager or the like of the AP execution device 10 couples the AP execution device 10 to the communication network 5 (S1111).

Subsequently, the manager or the like of the cluster management device 4 registers (stores) information on the above-described AP execution device 10 newly coupled to the communication network 5 as the AP execution device information 451 (S1112). It should be noted that, the newly registered AP execution device information 451 is also notified to (shared with) the inter-process information sharing unit 423 and is shared with the AP execution devices 10 in the cluster to which the AP execution device 10 belongs to.

Figure 12:
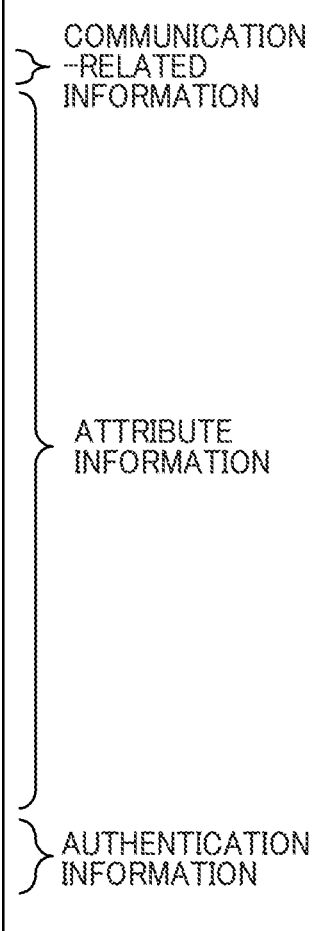
FIG. 12 is an example of AP execution device information 451.

FIG. 12 is an example of the AP execution device information 451. The illustrated AP execution device information 451 is written as data in the JSON format. The AP execution device information 451 includes communication-related information, the above-described attribute information, and authentication information.

Among the above, the communication-related information is information (for example, an IP address of the AP execution device 10, a port number of the AP process 800, or the like) required to perform the communications between the AP execution devices 10 (the AP processes 800) when the processing of the AP software is executed through coordination between the AP execution devices 10 (the AP processes 800) belonging to the same cluster. In FIG. 12, the information written in a line "0002" corresponds to the communication-related information.

Additionally, the attribute information is information required to identify the AP execution device 10 as a transfer destination when the AP process executes the above-described "transfer processing" and is, for example, information identifying an organization managing the hub 8 in which the AP execution device 10 is disposed and the AP execution device 10, the name of the AP execution device 10, information indicating a configuration (information on a processor and a memory) of the AP execution device 10, and the like. It should be noted that, when the AP execution device 10 provides a virtual machine, the attribute information includes information on the virtual machine. In FIG. 12, the information written in lines "0003" to "0019" corresponds to the attribute information.

Moreover, the authentication information is information (a user ID, a password) or the like required to access (communicate with or use, for example) the AP process 800 of the AP execution device 10 and the function implemented by the AP process 800. In FIG. 12, the information written in lines "0020" to "0021" corresponds to the authentication information.

Figure 13:
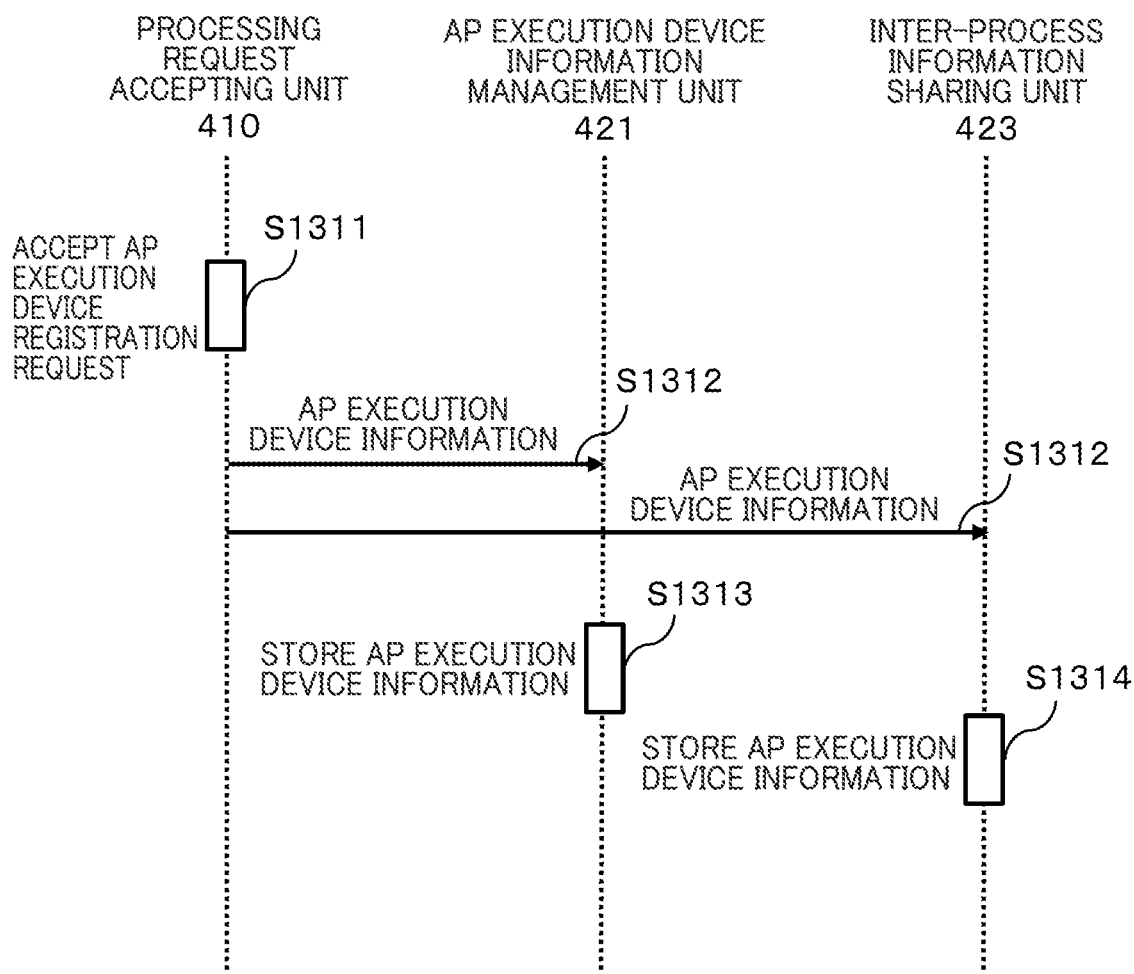
FIG. 13 is a diagram describing an AP execution device information accepting sequence.

FIG. 13 is a sequence diagram describing processing (hereinafter, referred to as an "AP execution device information accepting sequence S1300") that is executed when the cluster management device 4 accepts the AP execution device information from the client device 2 in S1112 in FIG. 11.

First, the processing request accepting unit 410 receives the AP execution device information from the client device 2 (S1311) and transmits the received AP execution device information to the cluster management unit 420, and the cluster management unit 420 (the AP execution device information management unit 421, the inter-process information sharing unit 423) receives the AP execution device information (S1312).

The AP execution device information management unit 421 of the cluster management unit 420 stores the received AP execution device information as the AP execution device information 451 (S1313). Additionally, the inter-process information sharing unit 423 of the cluster management unit 420 stores the received AP execution device information 451 as a management target (S1314).

It should be noted that, as another processing order, the AP execution device information management unit 421 may transmit the AP execution device information to the inter-process information sharing unit 423 (S1312) after the AP execution device information is registered (S1313), and the inter-process information sharing unit 423 may store the AP execution device information 451 (S1314).

Figure 14:
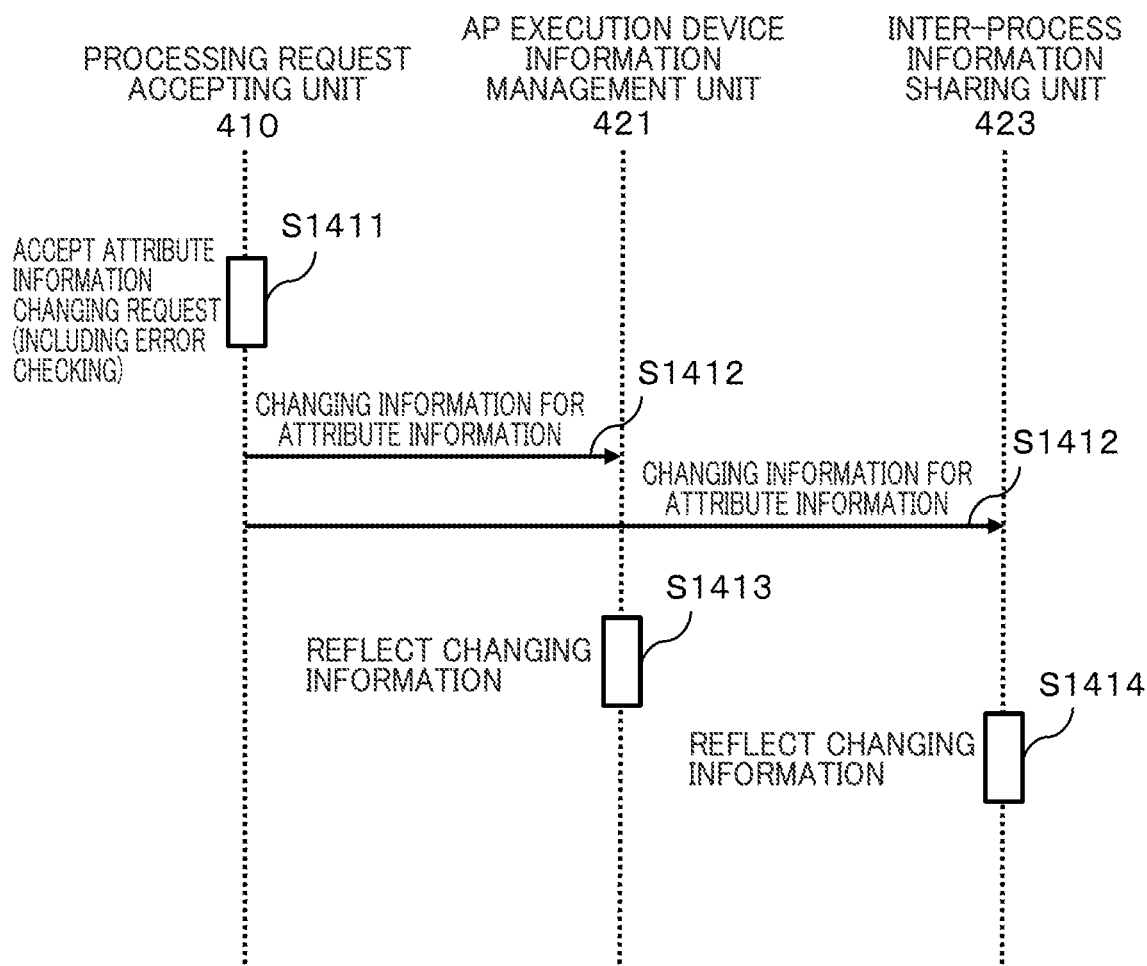
FIG. 14 is a diagram describing an attribute information changing sequence.

FIG. 14 is a sequence diagram describing processing (hereinafter, referred to as an "attribute information changing sequence S1400") that is executed when the cluster management device 4 accepts a request for changing the attribute information from the client device 2.

First, the processing request accepting unit 410 receives the changing information for the attribute information from the client device 2 (S1411) and transmits the received above-described changing information to the cluster management unit 420, and the cluster management unit 420 (the AP execution device information management unit 421, the inter-process information sharing unit 423) receives the above-described changing information (S1412). It should be noted that, when accepting the above-described changing information, the processing request accepting unit 410 may examine the contents of the above-described changing information (examine whether an illegal character is included in the changing information or whether there is no duplication of identifiers of the AP execution device 10 included in the changing information, for example) to prevent the attribute information with illegal contents from being stored into the cluster management device 4. In this way, it is possible to obviate the occurrence of trouble by examining the contents of the changing information by the processing request accepting unit 410.

Subsequently, the AP execution device information management unit 421 reflects the received above-described changing information to the AP execution device information 451 (S1413). Additionally, the inter-process information sharing unit 423 reflects the transmitted above-described changing information to the AP execution device information stored in itself (S1414). It should be noted that, the contents of the AP execution device information 451 and the contents of the AP execution device information stored in the inter-process information sharing unit 423 need to be synchronized with each other; thus, it is preferable to reflect the above-described changing information to the contents of the AP execution device information stored in the inter-process information sharing unit 423 (S1414) after the reflection of the above-described changing information to the AP execution device information 451 in S1413 is confirmed.

Figure 15:
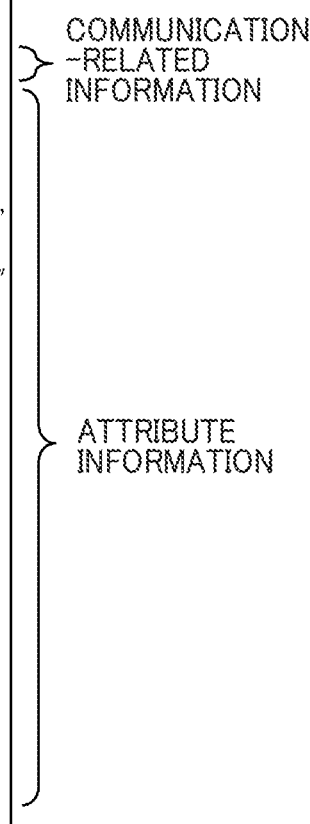
FIG. 15 is an example of changing information for attribute information.

FIG. 15 is an example of the changing information for the attribute information. The illustrated changing information is written as data in the JSON format. The illustrated changing information includes the communication-related information (in a line "0002") and the attribute information (in lines "0003" to "0019") but no authentication information. It should be noted that, the reason why the changing information includes the communication-related information is that it is required to identify the AP execution device information as a target to which the changing information is reflected.

Figure 16:
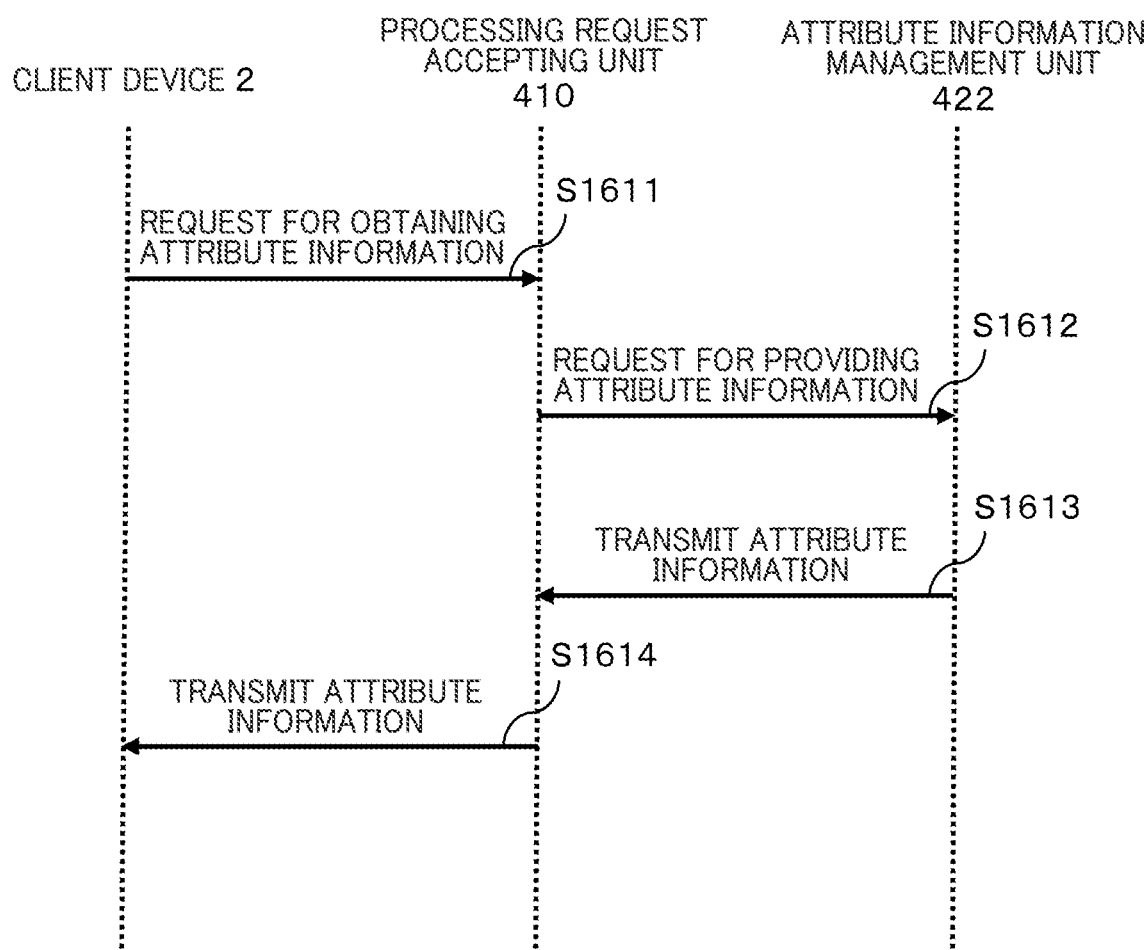
FIG. 16 is a diagram describing an attribute information provision sequence.

FIG. 16 is a sequence diagram describing processing (hereinafter, referred to as an "attribute information provision sequence S1600") that is executed when the cluster management device 4 accepts the request for obtaining the attribute information from the client device 2. It should be noted that, the user refers to the attribute information provided by the processing during the editing of the AP software, for example.

First, the processing request accepting unit 410 accepts the request for obtaining the attribute information from the client device 2 (S1611). The above-described obtainment request may be a request designating the attribute information of a specific AP execution device 10 or may be a request designating multiple pieces of the attribute information managed by (stored in) the cluster management device 4.

Once receiving the above-described obtainment request, the processing request accepting unit 410 transmits a request for providing the attribute information designated by the above-described obtainment request to the attribute information management unit 422 of the cluster management unit 420 (S1612).

Once receiving the above-described provision request, the attribute information management unit 422 transmits the attribute information designated by the provision request to the processing request accepting unit 410 (S1613).

Once receiving the attribute information from the attribute information management unit 422, the processing request accepting unit 410 transmits the received attribute information to the client device 2 (S1614).

Figure 17:
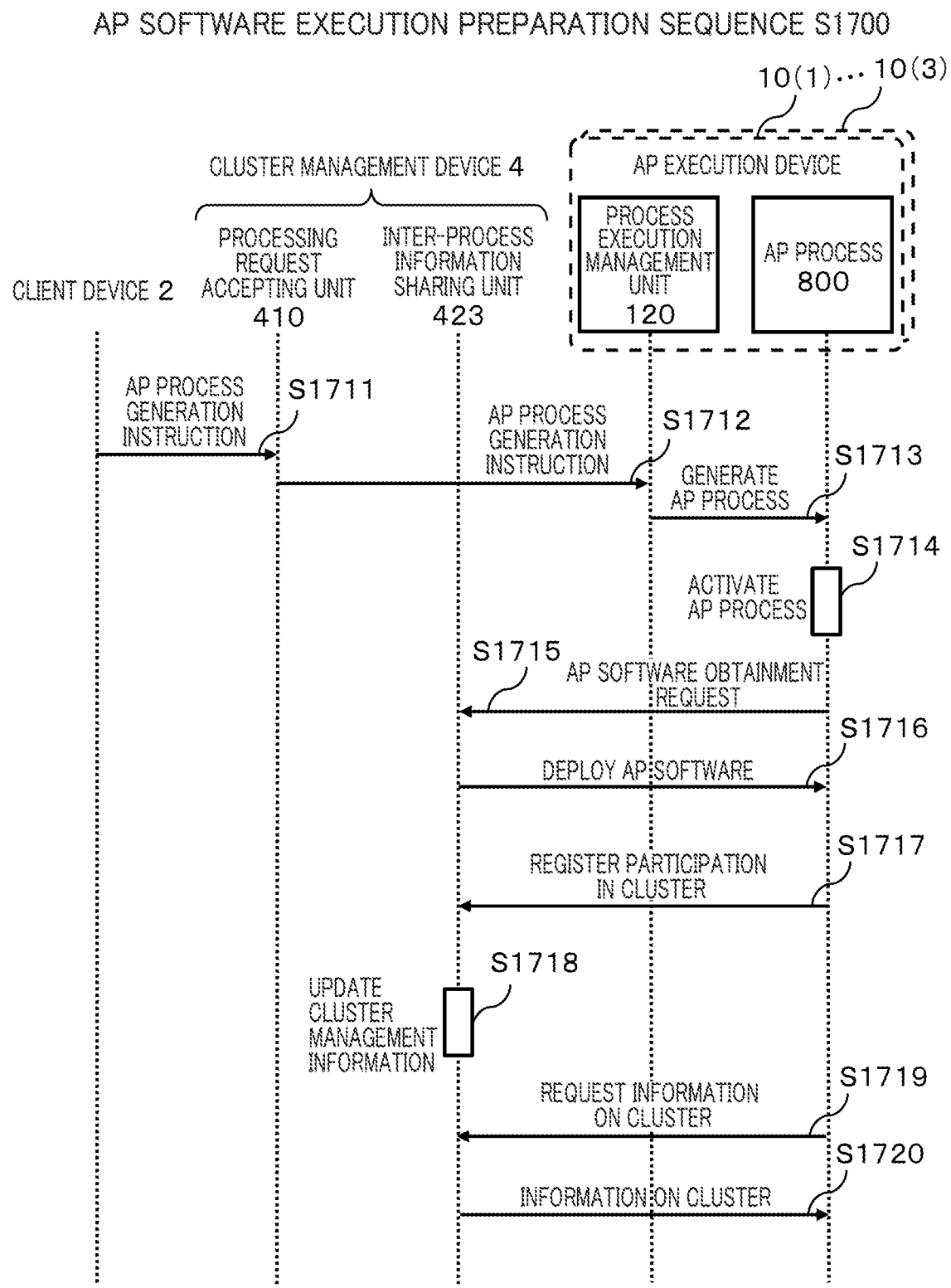
FIG. 17 is a diagram describing an AP software execution preparation sequence.

FIG. 17 is a sequence diagram describing processing (hereinafter, referred to as an "AP software execution preparation sequence S1700") that is executed when the cluster management device 4 receives the instruction to generate the AP process 800 from the client device 2. The AP software execution preparation sequence S1700 is preparation processing for the AP execution device 10 to execute the AP software 7.

First, the instruction to generate the AP process 800 is transmitted from the client device 2 to the processing request accepting unit 410 of the cluster management device 4 (S1711).

Once receiving the above-described generation instruction, the processing request accepting unit 410 transmits the instruction to generate the AP process to multiple AP execution devices 10 (AP execution devices 10 belonging to the same cluster; in this example, three AP execution devices 10(1) to (3) belong to the same cluster) that are planned to execute the AP process 800 as the target of the generation instruction through coordination (S1712).

Once receiving the above-described generation instruction (S1713), the process execution management unit 120 of the AP execution device 10 generates the AP process 800 (S1713, S1714).

The activated AP process 800 transmits a request for obtaining the AP software 7 to the inter-process information sharing unit 423 (S1715). Once receiving the above-described obtainment request, the inter-process information sharing unit 423 transmits the requested AP software 7 to the AP process 800 as the requester, and the AP process 800 receives and stores the above-described AP software 7 (S1716). In this way, the AP software 7 is deployed to the AP execution device 10 (the AP process 800).

Subsequently, the AP process 800 transmits a request for registering the participation in the cluster (cluster to which the AP execution devices 10 that process the AP software 7 belong through coordination) to the inter-process information sharing unit 423 (S1717). Once receiving the above-described participation registration request, the inter-process information sharing unit 423 updates the cluster management information 452 and registers the AP process 800 into the above-described cluster (S1718).

Subsequently, the AP process 800 transmits a request for providing information (information on the AP process 800 belonging to the cluster (list information or the like), attribute information on the AP execution device 10 in which the AP process 800 belonging to the cluster exists, and the like) on the above-described predetermined cluster to the inter-process information sharing unit 423 (S1719).

Once receiving the above-described provision request, the inter-process information sharing unit 423 obtains the information from the storage unit 405 and transmits the obtained information to the AP process 800 (S1720).

Figure 18:
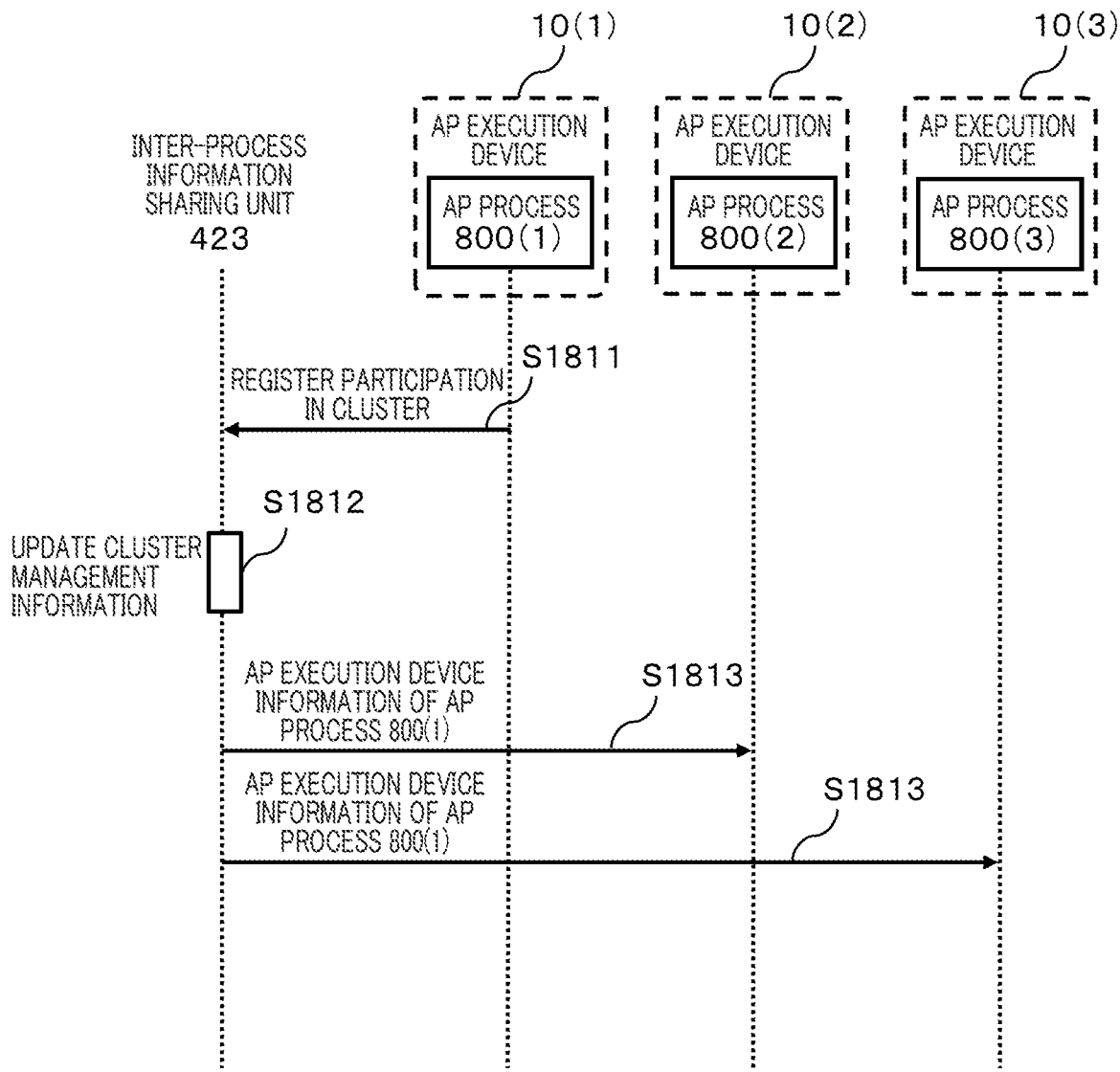
FIG. 18 is a diagram describing an intra-cluster information sharing sequence (when the AP process is activated).

FIG. 18 is a sequence diagram describing processing (hereinafter, referred to as an "intra-cluster information sharing sequence (when the AP process is activated) S1800") that is related to the information sharing between the AP execution devices 10 belonging to the cluster (in this example, the three AP execution device 10(1) to (3) belong thereto), the processing being executed when a new AP process 800 participates in the cluster.

When a new AP process 800(1) is activated in the AP execution device 10(1) belonging to a cluster, the AP process 800(1) transmits the request for registering the participation in the cluster, as described above (S1811).

Once receiving the above-described participation registration request, the inter-process information sharing unit 423 updates the cluster management information 452 and registers the AP process 800(1) into the above-described cluster (S1812).

Subsequently, the inter-process information sharing unit 423 transmits the AP execution device information (including communication information, the attribute information, and the authentication information) of the AP execution device 10(1) in which the AP process 800(1) exists to the other AP execution devices 10(2), (3) belonging to the cluster, and the other AP execution devices 10(2), (3) receive and store the above-described AP execution device information (S1813).

Figure 19:
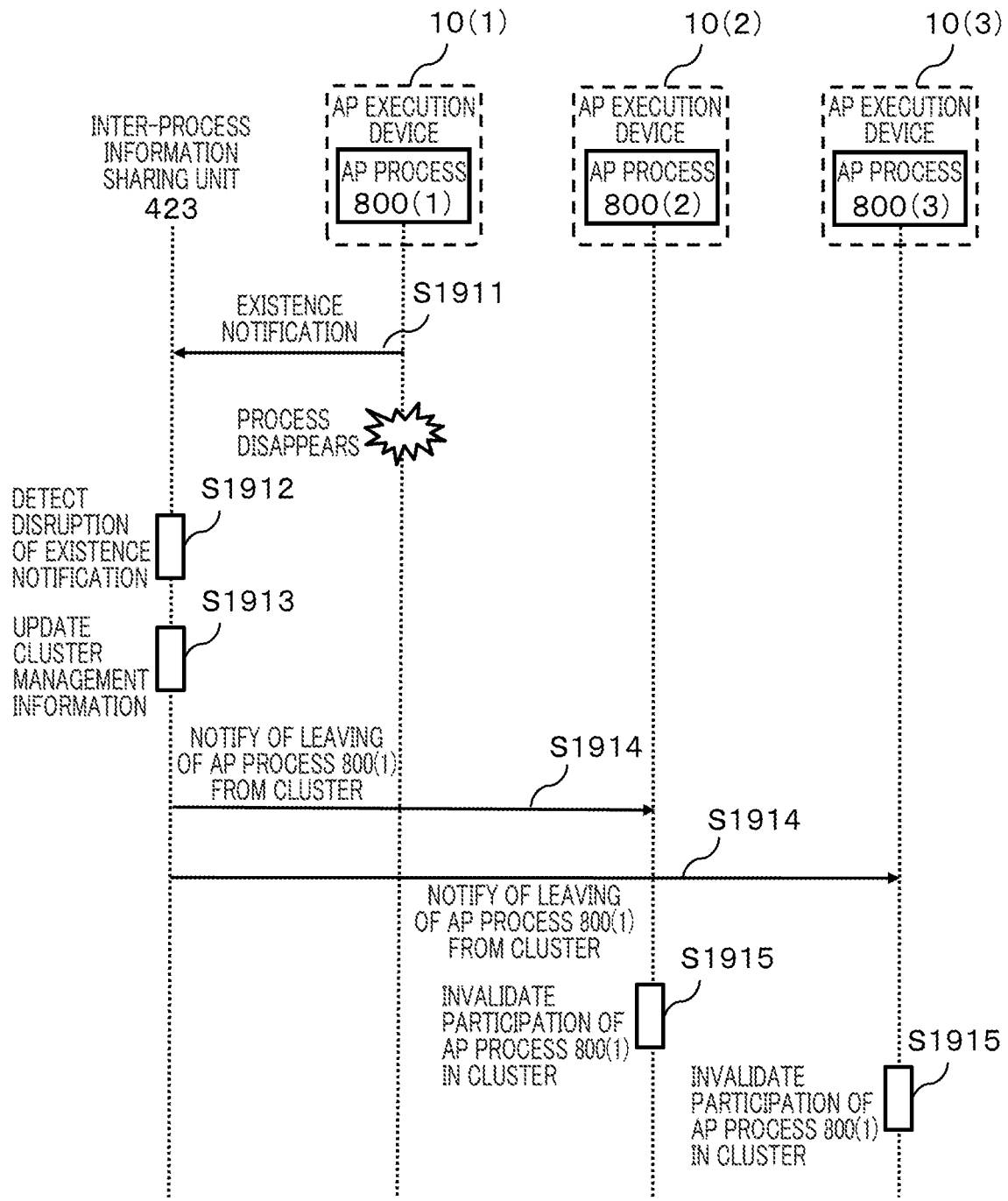
FIG. 19 is a diagram describing the intra-cluster information sharing sequence (when the AP process disappears).

FIG. 19 is a sequence diagram describing processing (hereinafter, referred to as an "intra-cluster information sharing sequence (when the AP process disappears) S1900") that is related to the information sharing between the AP execution devices 10 belonging to the cluster (in this example, the three AP execution device 10(1) to (3) belonging thereto) and that is executed when the AP process 800 disappears. It should be noted that, the reason of the disappearance of the AP process 800 may be, for example, a failure of the AP execution device 10 or the communication network 5, execution of an operation to make the disappearance intended by the user, or the like.

The inter-process information sharing unit 423 monitors the existence notification transmitted from the AP process 800 in real-time (S1911). Once detecting a disruption of the existence notification of an AP process 800(1) (S1912), the inter-process information sharing unit 423 updates the cluster management information 452 and invalidates the participation of the AP process 800(1) in the cluster to which the AP process 800(1) is belonging currently (S1913).

Subsequently, the inter-process information sharing unit 423 notifies the other AP processes 800(2), (3) belonging to the above-described cluster that the AP process 800(1) leaves the cluster (S1914). Once receiving the above-described notification, the other AP processes 800(2), (3) update the information on the state of the participation in the cluster stored in the AP processes 800(2), (3) and invalidate the participation of the AP process 800(1) in the cluster (S1915).

It should be noted that, with the above-described AP software execution preparation sequence S1700, intra-cluster information sharing sequence (when the AP process is activated) S1800, and intra-cluster information sharing sequence (when the AP process disappears) S1900, the synchronization of the information on the cluster is maintained continuously between the AP execution devices 10 (the AP processes 800) belonging to the same cluster.

Figure 20:
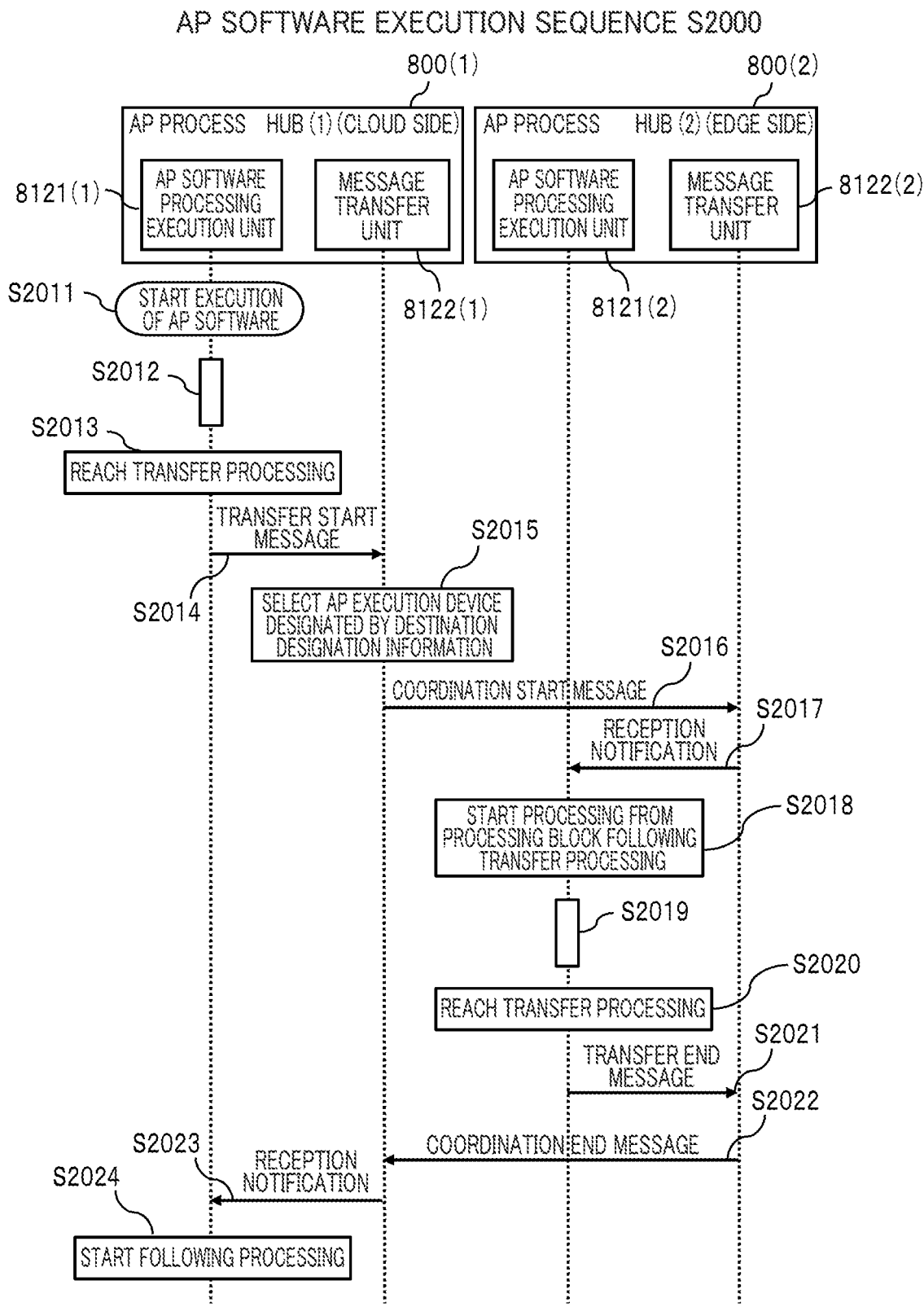
FIG. 20 is a diagram describing an AP software execution sequence.

FIG. 20 is a sequence diagram describing a flow of processing (hereinafter, referred to as an "AP software execution sequence S2000") when the AP execution devices 10 (the AP processes 800) execute the AP software 7. It should be noted that, in this example, the AP process 800(1) of the AP execution device 10(1) in the hub 8(1) and the AP process 800(2) of the AP execution device 10(2) in the hub 8(2) belonging to the same cluster execute the AP software 7 through coordination. Additionally, the AP software 7 has a configuration illustrated in FIG. 21 as an example.

As illustrated in FIG. 20, first, an AP software processing execution unit 8121(1) of the AP process 800(1) starts executing the AP software 7 (starts the execution from the "processing A" in sequence) in response to the instruction to start the execution from the cluster management device 4 (S2011, S2012).

Once the processing reaches "transfer processing a" after the execution of the "processing B" (S2013), the AP software processing execution unit 8121(1) transmits a message (hereinafter, referred to as a "transfer start message") including information required for the processing to be coordinated with (passed to) the AP process 800(2) to a message transfer unit 8122(1) of the AP process 800(1) (S2014).

FIG. 22 illustrates an example of the transfer start message. As illustrated in FIG. 22, the transfer start message includes information (the description in a line "0002"; hereinafter, referred to as "destination device designation information") designating the AP execution device 10 as a destination, an identifier of the "transfer processing a" (the description in a line "0003"; hereinafter, referred to as a "processing block ID"), information (the description in a line "0004"; hereinafter, referred to as a "transfer type") indicating the type (kind) of the message, and information (the description in lines "0005" to "0007"; hereinafter, referred to as "coordinated information") passed to a processing block as the coordination destination (the passing destination).

In this example, "edge_siteA" is written as the destination device designation information. This designates that the AP execution device 10(2) existing in the hub 8(2) should be designated as the destination. Additionally, "start" is designated as the transfer type. This indicates that the message is the transfer start message. For example, when the AP software 7 is the one illustrated in FIG. 3, the coordinated information is the learning model 30 (a parameter).

Referring back to FIG. 20, once receiving the transfer start message, the message transfer unit 8122(1) compares the destination device designation information in the transfer start message with the AP execution device information 451 and the cluster management information 452 and selects the AP execution device 10(2) having the attribute designated by the destination device designation information as the AP execution device 10(2) as the coordination destination (S2015). It should be noted that, for the above-described selection, the message transfer unit 8122(1) obtains information (for example, a network address of the AP execution device 10 and a port number of the AP process 800(2) of the AP execution device 10(2)) identifying the location of the selected AP execution device 10(2) (the AP process 800(2)).

Subsequently, the message transfer unit 8122(1) transmits a message (hereinafter, referred to as a "coordination start message") notifying the start of the coordination to the selected AP execution device 10(2) (the AP process 800(2)) (S2016).

FIG. 23 illustrates an example of the coordination start message. As illustrated in FIG. 23, the coordination start message includes information (the description in a line "0002"; hereinafter, referred to as "transmitter information") indicating the AP execution device 10(1) as the transmitter, the identifier of the "transfer processing a" (the description in a line "0003"; hereinafter, referred to as the "processing block ID"), the information (the description in a line "0004"; hereinafter, referred to as the "transfer type") indicating the type (kind) of the message, the information (the descriptions in lines "0005" to "0007"; hereinafter, referred to as the "coordinated information") passed to the processing block of the coordination destination (the passing destination). It should be noted that, the transmitter information is information required when the AP process 800(2) as the coordination destination passes the processing to the AP process 800(1) again.

Referring back to FIG. 20, once receiving the coordination start message, a message transfer unit 8122(2) of the AP process 800(2) of the AP execution device 10(2) as the coordination destination notifies of (transmits) the received coordination start message to the AP software processing execution unit 8121(2) of the AP process 800(2) (S2017).

Once receiving the coordination start message, the AP software processing execution unit 8121(2) starts the processing from the "processing C" with the contents of the "coordinated information" in the coordination start message being inputted to the AP software processing execution unit 8121(2) (S2018, S2019). It should be noted that, since the identifier of the "transfer processing a" is set to the "processing block ID" in the coordination start message, the AP software processing execution unit 8121(2) starts the processing from the "processing C" following the "transfer processing a".

Once the processing reaches "transfer processing b" after the execution of the "processing D" (S2020), the AP software processing execution unit 8121(2) subsequently notifies of (transmits) a message (hereinafter, referred to as a "transfer end message") instructing the coordination (passing) of the processing with the AP process 800(1) to the message transfer unit 8122 (2) of the AP process 800(2) (S2021).

Once receiving the transfer end message, the message transfer unit 8122(2) transmits a message (hereinafter, referred to as a "coordination end message") notifying the end of the coordination to the AP process 800(1) of the AP execution device 10(1) (S2022).

FIG. 24 illustrates an example of the coordination end message. As illustrated in FIG. 24, the coordination end message includes the information (the description in a line "0002"; hereinafter, referred to as the "transmitter information") indicating the AP execution device 10(1) as the transmitter of the coordination start message, the identifier of the "transfer processing a" (the description in a line "0003"; hereinafter, referred to as the "processing block ID"), the information (the description in a line "0004"; hereinafter, referred to as the "transfer type") indicating the type (kind) of the message, the information (the descriptions in lines "0005" to "0007"; hereinafter, referred to as the "coordinated information") passed to the processing block of the coordination destination (the passing destination). It should be noted that, the transmitter information in the coordination end message is the same as the transmitter information in the coordination start message. Additionally, for example, when the AP software 7 is the one illustrated in FIG. 3, the learning model 30 (the parameter) updated by the sensor data is set to the coordinated information.

Referring back to FIG. 20, once receiving the coordination end message, the message transfer unit 8122(1) of the AP process 800(1) notifies of (transmits) the contents of the received coordination end message to the AP software processing execution unit 8121(1) (S2023). Once receiving the above-described notification, the AP software processing execution unit 8121(1) identifies a processing block that should be executed next based on the contents of the coordination end message (in this example, identifies "processing E") and starts the processing from the identified processing block ("processing E") with the "coordinated information" in the coordination end message being inputted to the AP software processing execution unit 8121(1) (S2024). It should be noted that, since the identifier of the "transfer processing a" is set to the "processing block ID" in the coordination end message, and "end" meaning the end of the coordination is set to the "transfer type", the AP software processing execution unit 8121(1) starts the processing from the "processing E" following the "transfer processing b".

As described above, the processing is coordinated between the AP execution devices 10 (the AP processes 800) in each hub 8 by way of the "transfer processing", and the processing is executed by the same (common) AP software 7 deployed to the AP execution devices 10 in each hub 8.

As described above in detail, in the information processing system 1 in this embodiment, the AP software 7 having the common (same) configuration is provided (deployed) to each of the multiple AP execution devices 10 that execute the processing through coordination; thus, there is no need to construct different AP software 7 for each AP execution device 10, and it is possible to efficiently develop the software that executes the processing through coordination between the multiple hubs 8 in the overall information processing system 1. Additionally, it is possible to designate the AP execution device 10 that executes the AP software 7 by the AP execution device information 451 that the user can set; thus, the user can select the execution environment for the AP software 7 easily and flexibly.

Moreover, the common (same) AP software 7 is provided (deployed) to all of the multiple AP execution devices 10; thus, the management (maintenance) load and the operation load of the AP software 7 may be less. Furthermore, it is possible to reduce the communication load in the overall information processing system 1 and also to improve the security.

Second Embodiment

As illustrated in FIG. 10, in the first embodiment, the AP software is directly provided from the client device 2 to the cluster management device 4; however, the management of the AP software including the version management may be performed by the AP management device 3, and the cluster management device 4 may receive the AP software provided from the AP management device 3. Hereinafter, differences from the first embodiment are mainly described.

Figure 25:
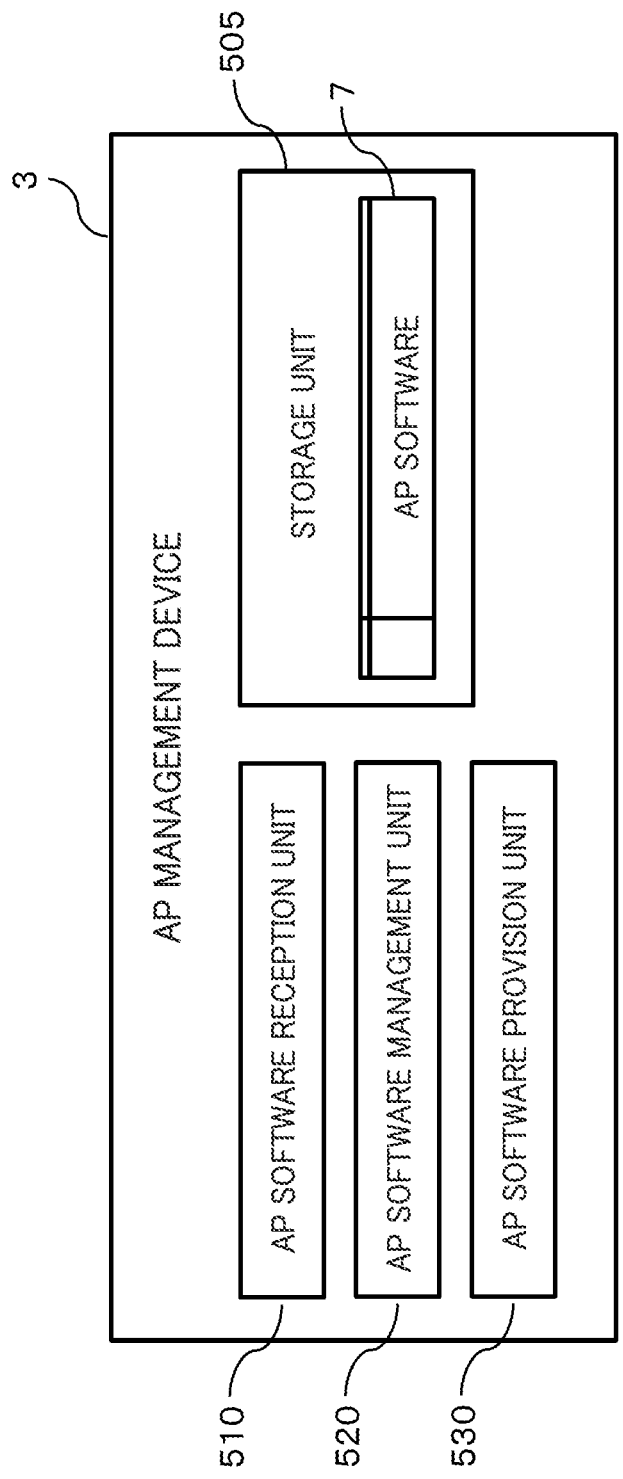
FIG. 25 is a diagram describing main functions of an AP management device in a second embodiment.

FIG. 25 is a diagram describing main functions of the AP management device 3 in a second embodiment. As illustrated in FIG. 25, the AP management device 3 in the second embodiment further includes an AP software provision unit 530 in addition to the functions that the AP management device 3 in the first embodiment has, including a storage unit 505, an AP software reception unit 510, and an AP software management unit 520. The AP software provision unit 530 transmits the AP software 7 of the designated version to the client device 4 in response to the request from the cluster management device 4.

Figure 26:
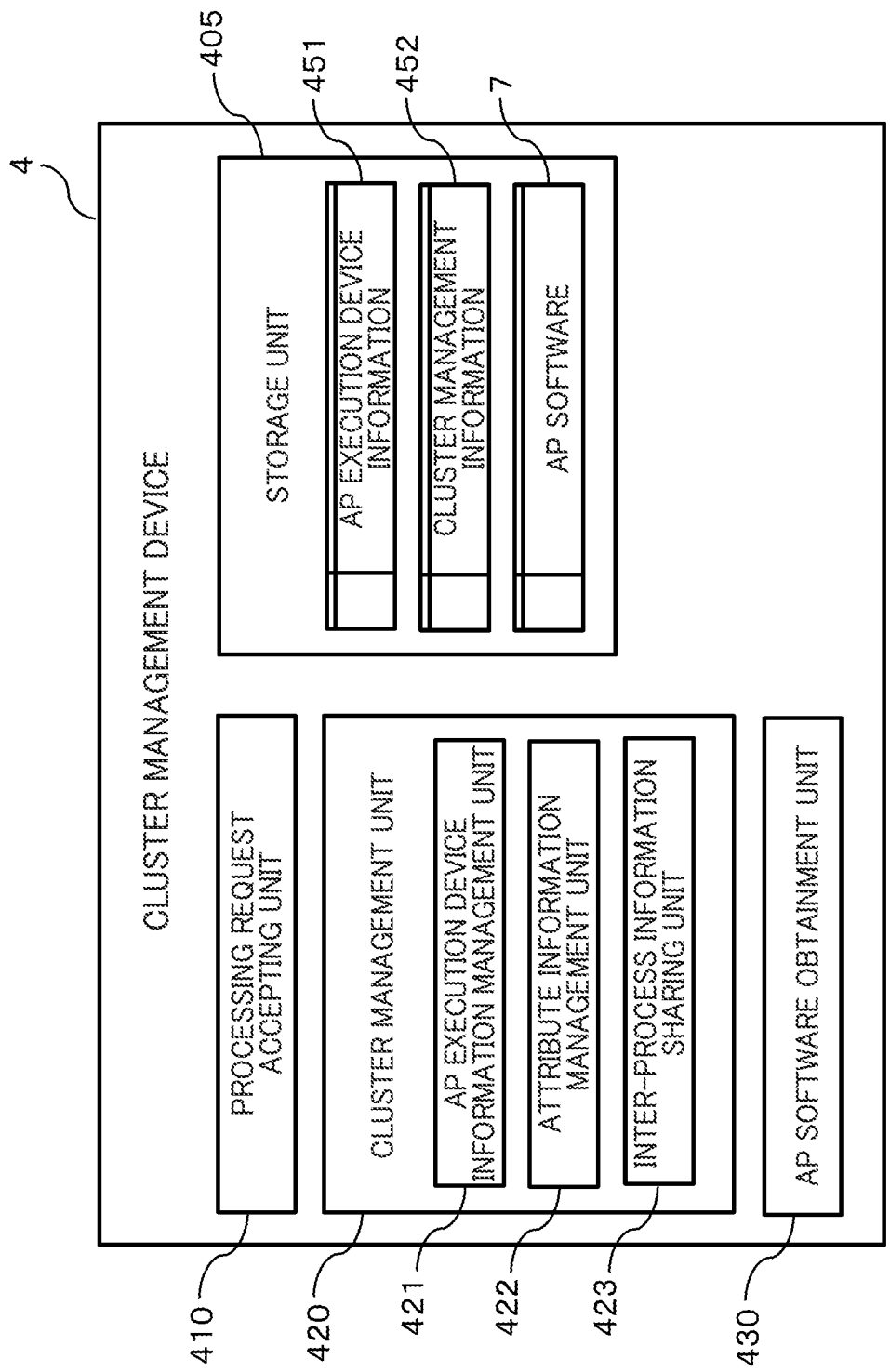
FIG. 26 is a diagram describing main functions of a cluster management device in the second embodiment.

FIG. 26 is a diagram describing main functions of the cluster management device 4 in the second embodiment. As illustrated in FIG. 26, the cluster management device 4 in the second embodiment further includes an AP software obtainment unit 430 in addition to the functions that the cluster management device 4 in the first embodiment has. The AP software obtainment unit 430 obtains the AP software 7 of a predetermined version from the AP management device 3 and reflects the obtained AP software 7 to the inter-process information sharing unit 423.

Figure 27:
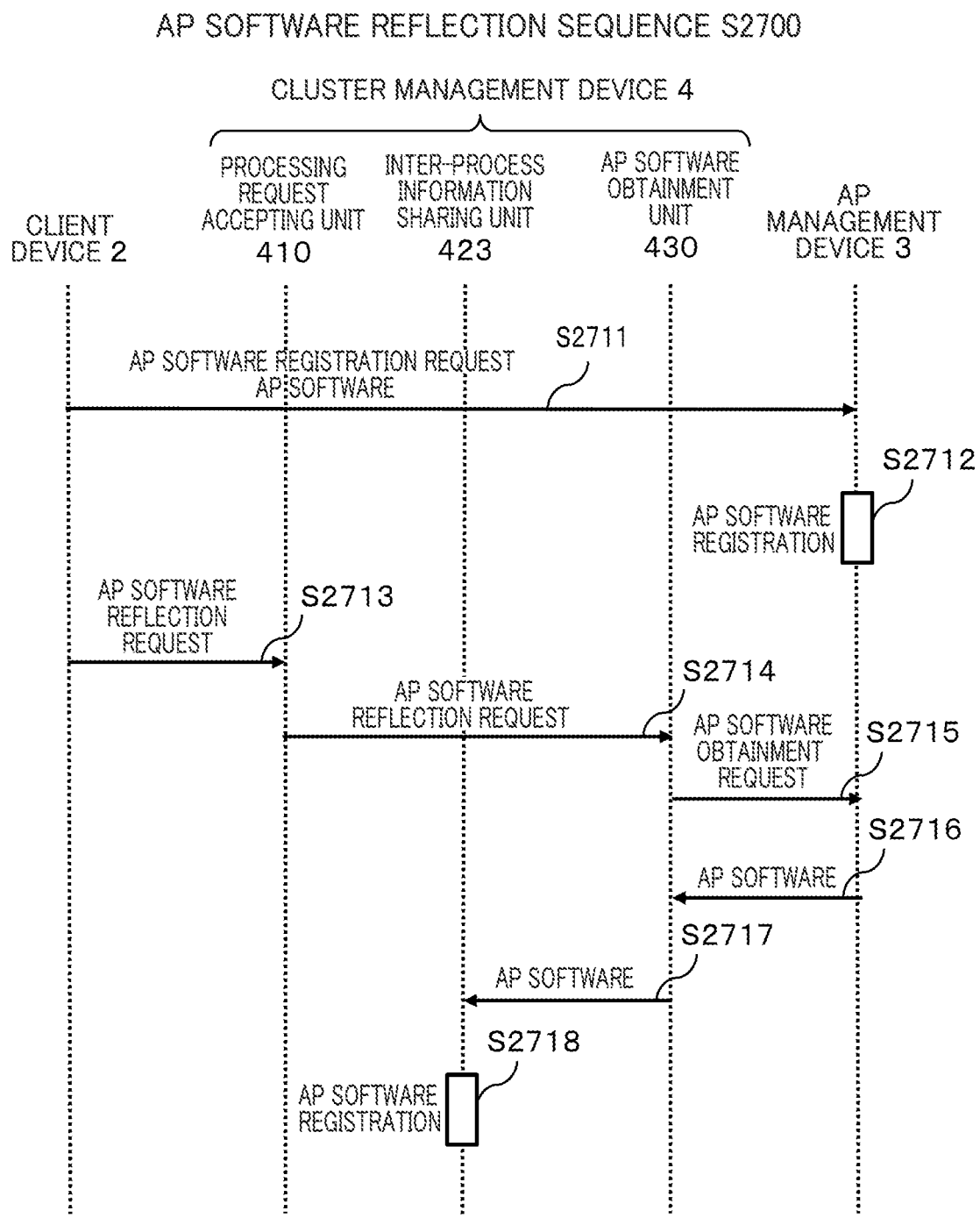
FIG. 27 is a diagram describing an AP software reflection sequence.

FIG. 27 is a sequence diagram describing a flow of processing (hereinafter, referred to as an "AP software reflection sequence S700") that is executed when the processing request accepting unit 410 of the cluster management device 4 in the second embodiment receives a request for reflecting the AP software from the client device 2.

As with the first embodiment, the AP software 7 is transmitted from the client device 2 to the AP management device 3 (S2711), and the AP management device 3 receives the transmitted AP software 7 and registers (stores) the AP software 7 as a management target (S2712).

Once receiving the request for reflecting the AP software from the client device 2 (S2713), the processing request accepting unit 410 of the cluster management device 4 notifies the AP software obtainment unit 430 of the received reflection request (S2714).

Once receiving the above-described reflection request, the AP software obtainment unit 430 transmits a request for obtaining the AP software to the AP management device 3 (S2715), obtains the AP software 7 from the AP management device 3 (S2716), and transmits the obtained AP software 7 to the inter-process information sharing unit 423 (S2717).

The inter-process information sharing unit 423 receives the AP software 7 and registers (stores) the received AP software 7 as a management target (S1018).

As described above, in the case of the configuration in which the AP management device 3 performs the management of the AP software including the version management, the cluster management device 4 may receive the AP software provided from the AP management device 3.

Third Embodiment

Figure 21:
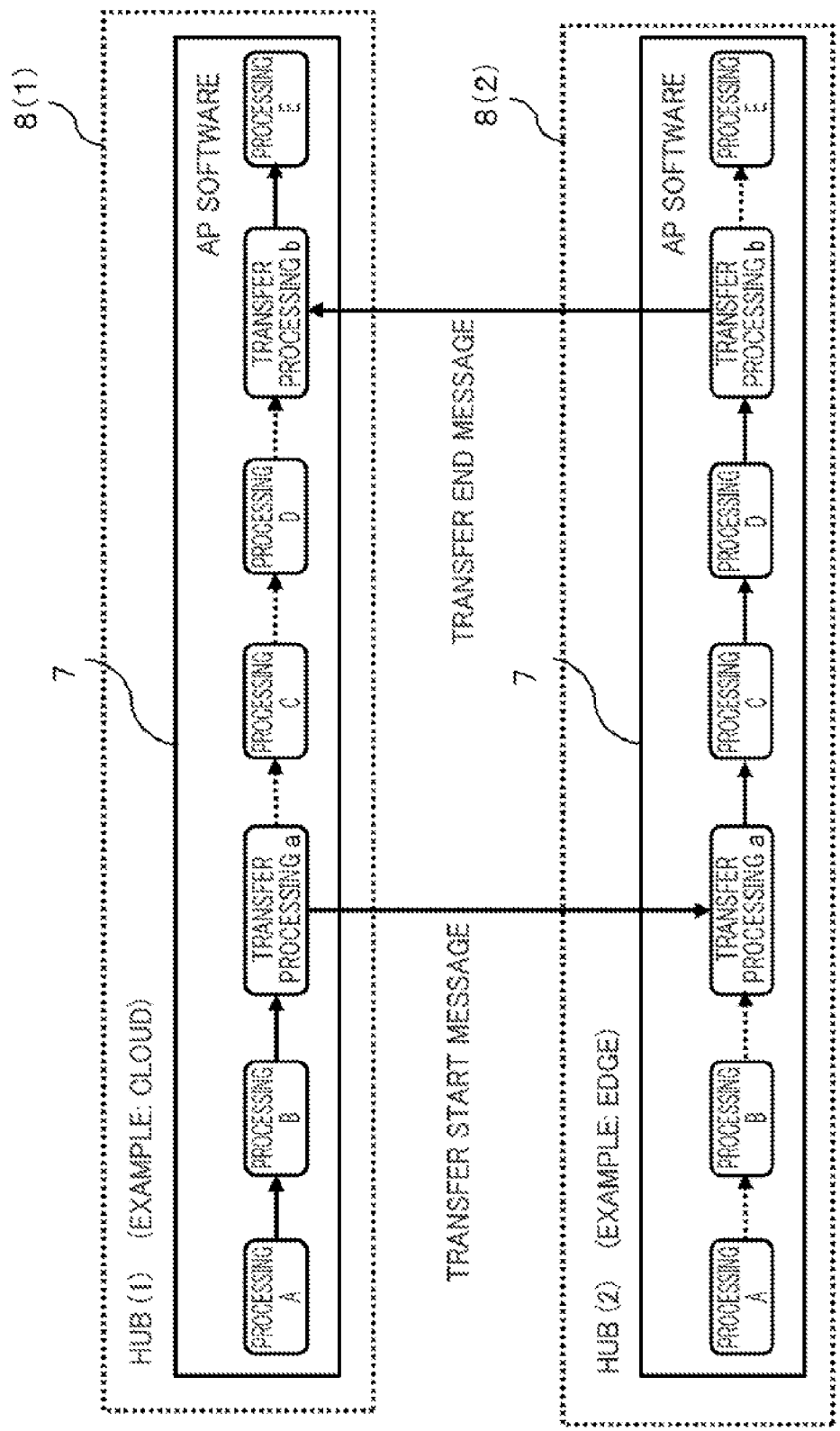
FIG. 21 is a diagram describing a configuration of the AP software.

As illustrated in FIGS. 21 and 22, in the information processing system 1 in the first embodiment, with the developer of the AP software 7 setting the destination device designation information in the "transfer processing a" of the AP software 7, processing blocks after the processing block are executed in the hub 8 designated by the destination device designation information. In contrast, in the information processing system 1 in the third embodiment described below, with the developer of the AP software 7 setting data (meta-information of data) required for processing after the processing in the transfer processing block of the AP software 7, the AP execution device 10 in the hub 8 that can execute processing blocks after the transfer processing block of the AP software (that can use the data) is selected automatically, and the processing of the processing blocks after the transfer processing block is executed by the selected AP execution device 10. According to this information processing system 1 in the third embodiment, the developer of the AP software 7 does not need to figure out which hub 8 the data required to execute the processing block exists in, and the processing block can be executed by the AP execution device 10 in the hub 8 that can use the data only by applying information (hereinafter, referred to as "data designation information") designating the data to the processing requiring the data. A basic configuration of the information processing system 1 in the third embodiment is similar to that of the information processing system 1 in the first embodiment. Hereinafter, differences from the first embodiment will be mainly described.

Figure 28:
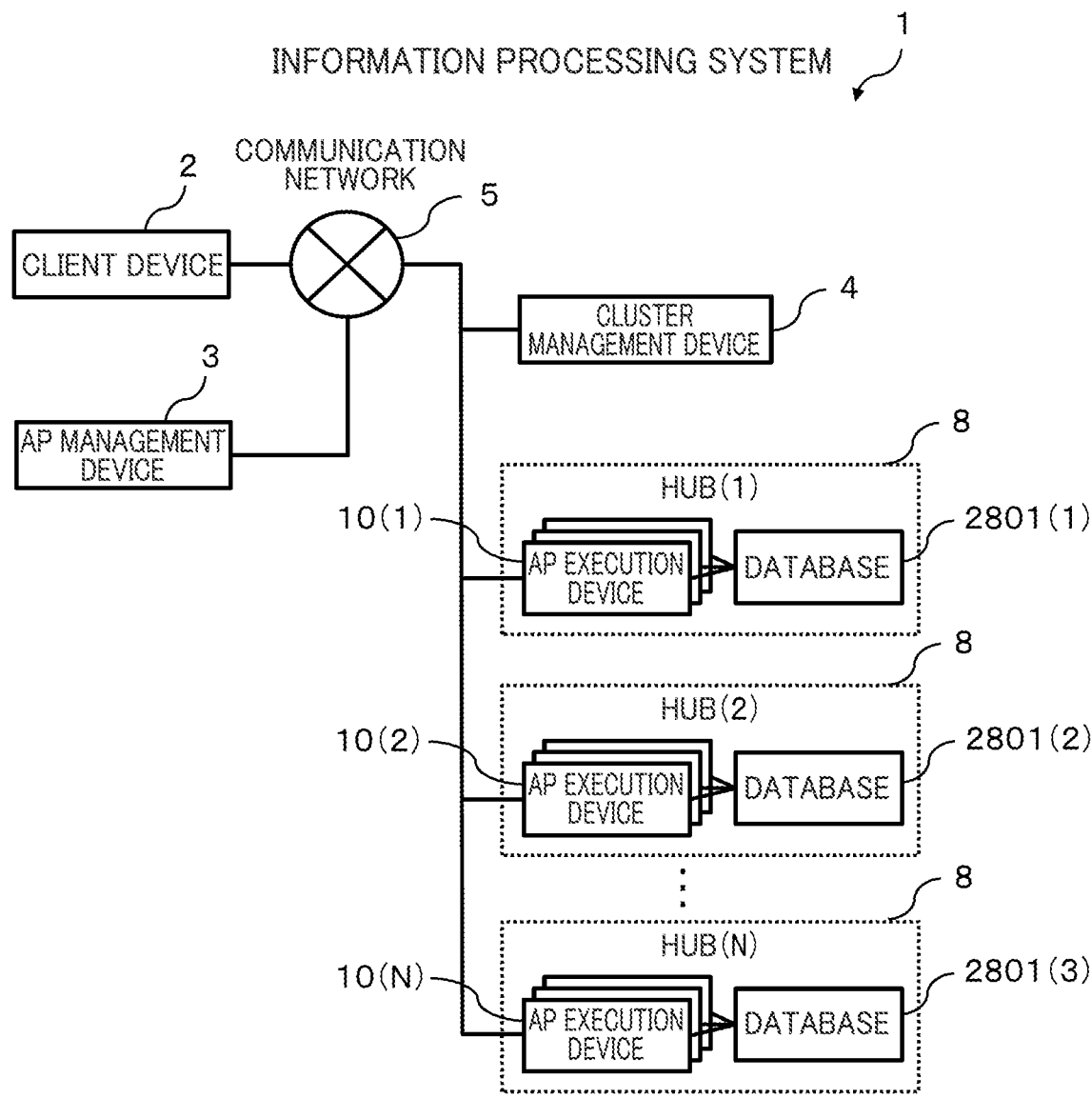
FIG. 28 is a diagram illustrating a schematic configuration of an information processing system in a third embodiment.

FIG. 28 is a diagram illustrating a schematic configuration of the information processing system 1 in the third embodiment. As illustrated in FIG. 28, in addition to the configuration that the information processing system 1 in the first embodiment has, the information processing system 1 in the third embodiment includes in each of the hubs 8 a database 2801 that manages data collected in the corresponding hubs 8. The database 2801 is, for example, a relational database implemented by a DBMS. Databases 2801 (1) to (N) in the respective hubs 8 are communicably coupled to the AP execution devices 10(1) to (N) existing in the corresponding hubs 8.

Figure 29:
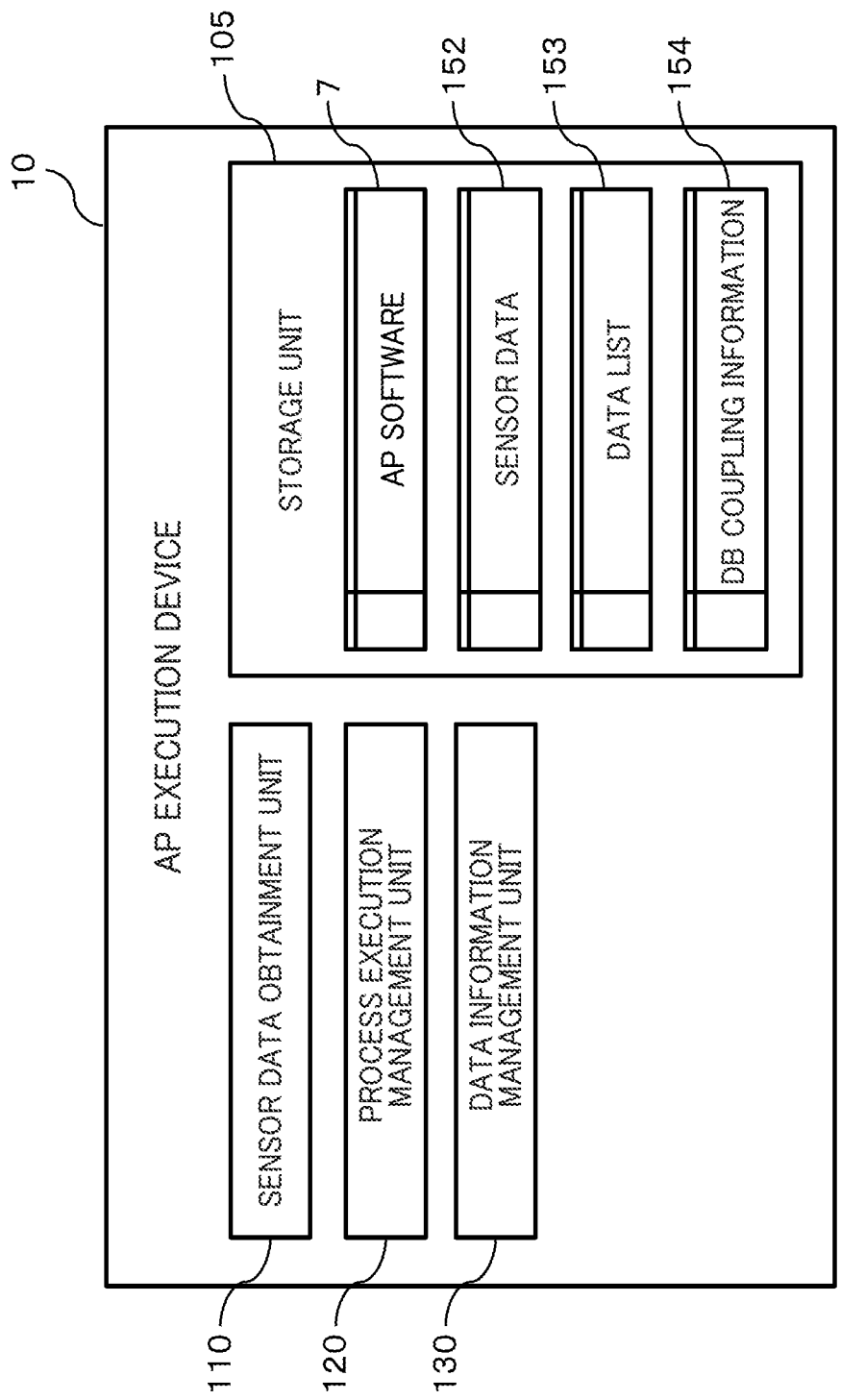
FIG. 29 is a diagram describing main functions of an AP execution device in the third embodiment.

FIG. 29 illustrates main functions that the AP execution device 10 in the third embodiment has. The AP execution device in the third embodiment includes a data information management unit 130 in addition to the functions that the AP execution device 10 in the first embodiment has. Additionally, the storage unit 105 of the AP execution device 10 in the third embodiment stores a data list 153 and DB coupling information 154 in addition to the data that the storage unit 105 in the first embodiment stores. The data list 153 in each hub 8 includes a list of information (the above-described data designation information) designating the data included in the database 2801 in the corresponding hub 8. The DB coupling information 154 includes information (hereinafter, referred to as "DB coupling information") required to access the data in the database 2801. An example of the DB coupling information may be a network address of the database 2801, information identifying the type of the database 2801, authentication information for accessing the database 2801, and the like.

The data information management unit 130 provides a user interface to edit (register, change, and delete, for example) the data list 153 and the DB coupling information 154. The user (data manager or the like) of each hub 8 can edit the data list 153 and the DB coupling information 154 through the data information management unit 130. The DB coupling information 154 is individually managed in each AP execution device 10 in order to prevent outflow of the information, for example, and is not transmitted to the cluster management device 4 in principle. The data list 153 is transmitted to also the cluster management device 4 through the communication network 5.

Figure 30:
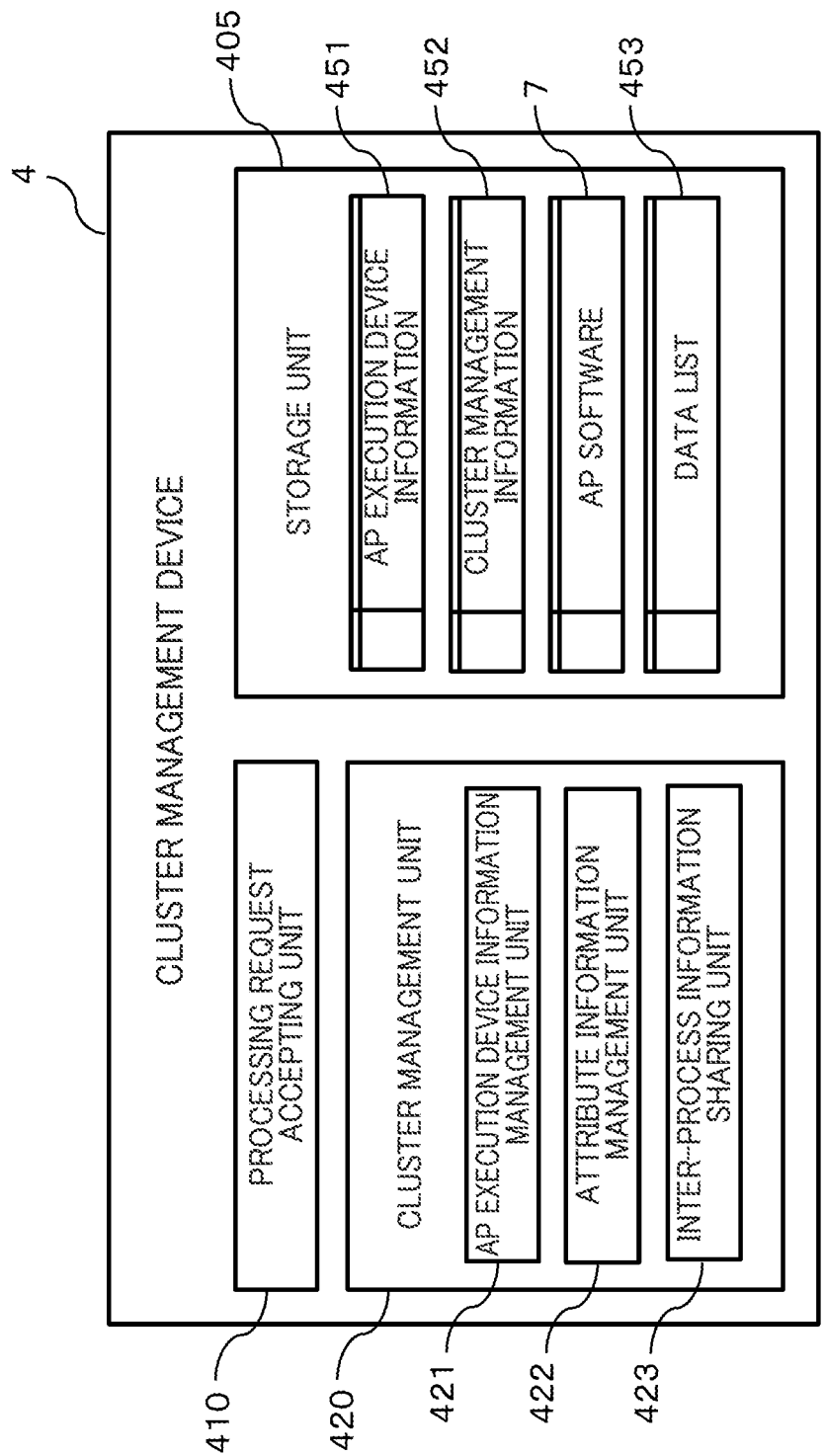
FIG. 30 is a diagram describing main functions of a cluster management device in the third embodiment.

FIG. 30 illustrates main functions that the cluster management device 4 in the third embodiment has. The storage unit 405 of the cluster management device 4 in the third embodiment stores a data list 453 in addition to the data that the storage unit 405 of the cluster management device 4 in the first embodiment stores. The data list 453 is data that is an integration of the data lists 153 transmitted from the AP execution devices 10 in the hubs 8 and is managed by the inter-process information sharing unit 423. It should be noted that, as described later, whether the AP execution device 10 actually can access each data registered in the data list 453 is confirmed (verified) when, for example, the AP software 7 is deployed to the AP execution device 10. The developer of the AP software 7 can refer to the data list 453 through the processing request accepting unit 410 of the client device 2. In this way, the developer of the AP software 7 can write the data designation information in the AP software 7 while checking the data list 453 during the development of the AP software 7.

FIG. 31 illustrates an example of the data list 453. The illustrated data list 453 includes one or more records including items (columns) of AP execution device ID 4531, data name 4532, and description 4533. An identifier (hereinafter, referred to as an "AP execution device ID") of the AP execution device 10 is set to the AP execution device ID 4531. Data designation information (in this example, a data name) is set to the data name 4532. Information (information to which a person such as the developer of the AP software 7 refers) describing the data is set to the description 4533. It should be noted that, an item (column) to which a format of each data and sample data is set may be further provided in the data list 453. Additionally, although the illustrated data list 453 is written in the format of relational database, the format of the data list 453 is not necessarily limited.

FIG. 32 illustrates a description example of the AP software 7 in the third embodiment. The illustrated AP software 7 is written according to syntax of the Python language. It should be noted that, the language for writing the AP software 7 is not necessarily limited. One processing block of the AP software 7 illustrated in FIG. 21 in the first embodiment corresponds to one function written in the AP software 7 illustrated in FIG. 32. Five functions are written in the AP software 7 illustrated in FIG. 32. Among the functions, a main function (in lines 3223 to 3226) is executed first, and the other four functions are called by the main function and executed in sequence. As illustrated in FIG. 32, in this example, a decorator written by using "@" sign is added only in an anomaly factor function (in lines 3206 to 3212). This decorator indicates that the Anomaly factor function is executed in the hub 8 that manages data corresponding to the data name (the data designation information) of "pic.line-a.jp". It should be noted that, it is possible to write multiple data names (data designation information) in the line 3206 concurrently.

"db_connector.get (data[0])" in the line 3209 is a function for accessing the data in the database 2801. With this function being executed, a value of the data is obtained from the database 2801. In the line 3211, processing using the value obtained in the line 3209 is executed. It should be noted that, the above-described function is written in a versatile description format that is independent from the type (hereinafter, referred to as a "DB type") of the database 2801. In this way, the developer of the AP software 7 can efficiently develop the AP software 7 regardless of the DB type.

FIG. 33 illustrates an example of the DB coupling information 154. The DB coupling information 154 manages the information (the DB coupling information) required for the AP execution device 10 to access the database 2801. The illustrated DB coupling information 154 includes one or more records including items of data name 1541, DB type 1542, coupling destination 1543, authentication information 1544, and the like.

The above-described data designation information is set to the data name 1541. Information indicating the DB type of the database 2801 storing the data is set to the DB type 1542. Coupling information (an IP address, a port number, or the like) used to access the database 2801 is set to the coupling destination 1543. Authentication information (a user ID, a password, or the like) required to access the database 2801 is set to the authentication information 1544.

It should be noted that, during the development of the AP software 7, the developer of the AP software 7 only needs to write a versatile function such as a data obtainment function (db_connector.get) written in the line 3209 of the AP software 7 in FIG. 32, and the access from the AP execution device 10 to the database 2801 is performed with the AP execution device 10 referring to the DB coupling information 154 managed on the hub 8 side. Thus, the developer of the AP software 7 can efficiently develop the AP software 7. It should be noted that, it is possible to improve the efficiency of the development of the AP software 7 by enabling the writing of a versatile function like the illustrated data obtainment function also in a case of writing processing of editing (registering, updating, or deleting, for example) the data managed by the database 2801 in the AP software 7.

Figure 34:
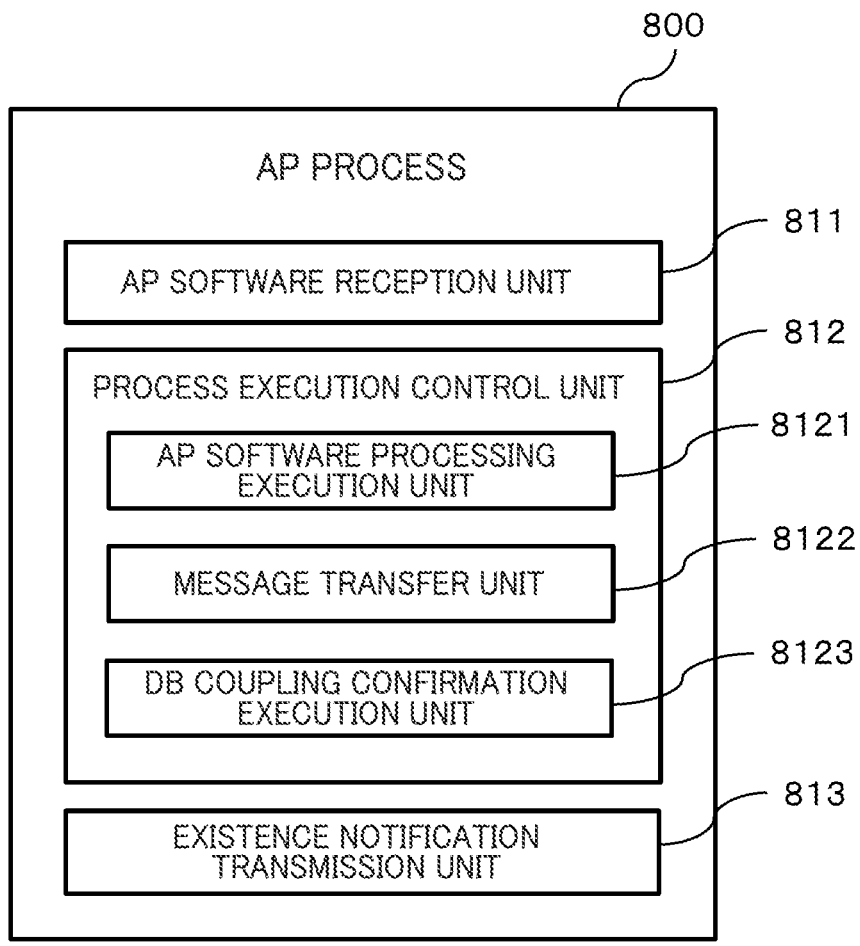
FIG. 34 is a diagram describing main functions implemented by an AP process in the third embodiment.

FIG. 34 illustrates main functions implemented by the AP process 800 in the third embodiment. As illustrated in FIG. 34, the AP process 800 in the third embodiment further includes a DB coupling confirmation execution unit 8123 in addition to the functions that the AP process 800 in the first embodiment has. In an appropriate timing such as when the AP software 7 is deployed to the AP execution device 10, the DB coupling confirmation execution unit 8123 executes processing (hereinafter, referred to as a DB coupling confirmation sequence S3500) for confirming whether it is possible to use the data corresponding to the data designation information written in the AP software 7 with the hub 8 in which the AP process 800 including itself exists.

Figure 35:
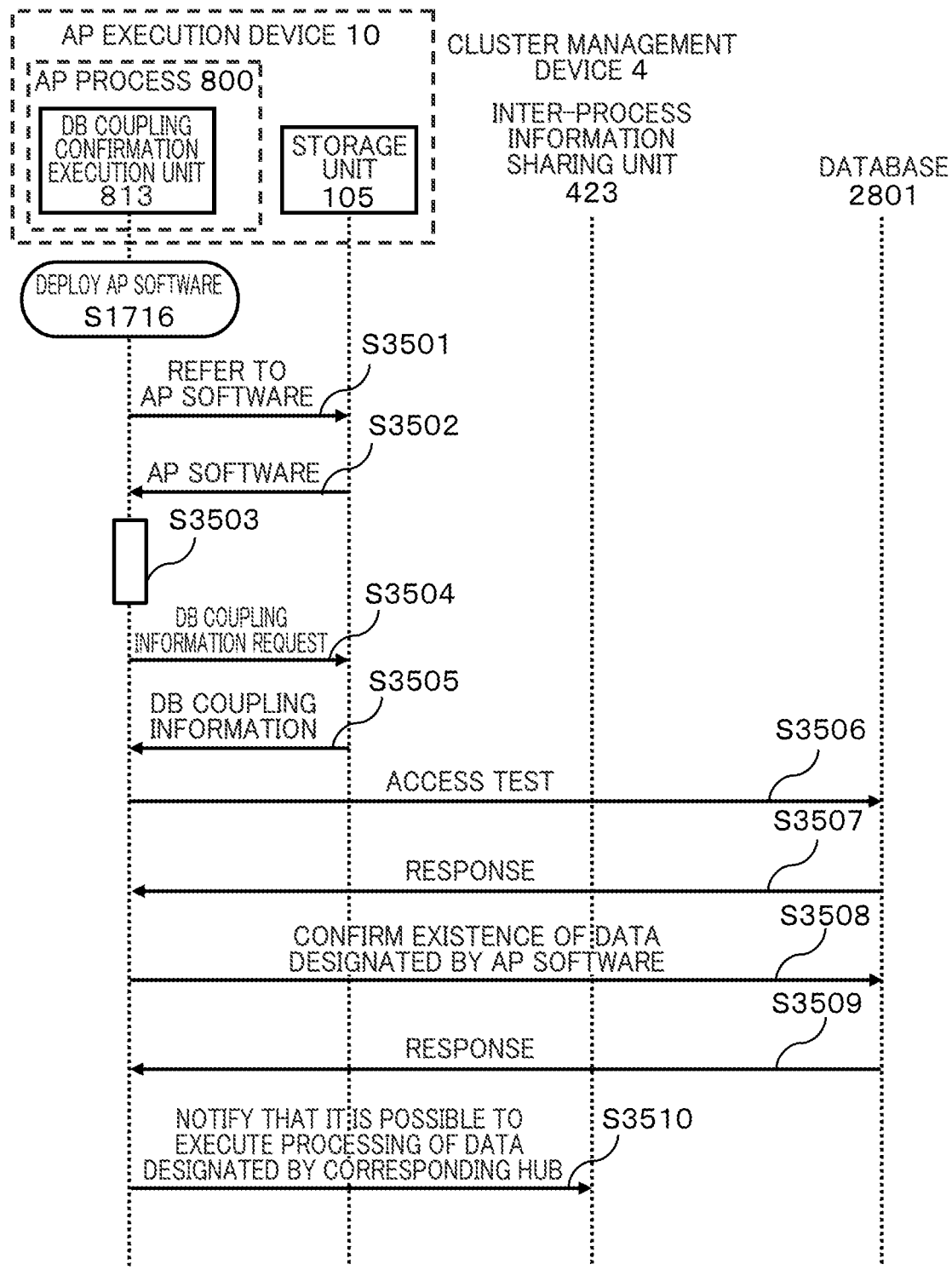
FIG. 35 is a diagram describing a DB coupling confirmation sequence.

FIG. 35 is a sequence diagram describing an example of the DB coupling confirmation sequence S3500. As illustrated in FIG. 35, once the AP software 7 is deployed and input to the AP process 800 in the AP software execution preparation sequence S1700 in FIG. 17 (S1716), the DB coupling confirmation execution unit 8123 refers to the AP software 7 stored in the storage unit 105 (S3501 to S3502) and reads the data designation information written in the AP software 7 (S3503). Additionally, the DB coupling confirmation execution unit 8123 obtains the DB coupling information 154 of the data corresponding to the read data designation information from the storage unit 105 (S3504 to S3505).

Subsequently, the DB coupling confirmation execution unit 8123 accesses the database 2801 by using the obtained DB coupling information 154 and confirms whether it is possible to access the database 2801 (for example, confirms whether a ping command reaches the database 2801) (S3506 to S3507).

Subsequently, the DB coupling confirmation execution unit 8123 confirms whether it is possible to use the data corresponding to the data designation information in the accessing database 2801 (whether it is possible to actually obtain a value of the data) (S3508 to S3509). When it is possible to use the data corresponding to the data designation information, the DB coupling confirmation execution unit 8123 notifies the inter-process information sharing unit 423 that it is possible to use the data in the AP process 800 including itself (that is, it is possible to execute processing (for example, the processing written in the lines 3206 to 3212 in FIG. 32) using the data) (S3510). On the other hand, when it is not possible to use the data corresponding to the data designation information, the DB coupling confirmation execution unit 8123 notifies the inter-process information sharing unit 423 that it is not possible to use the data in the AP process 800 including itself (that is, it is not possible to execute the processing using the data) (S3510).

The inter-process information sharing unit 423 updates the data list 453 by receiving the above notifications and provides the contents of the updated data list 453 to the AP execution devices 10 and the cluster management device 4. In this way, the message transfer unit 8122 of the AP process 800 can know which of the other AP processes 800 (the AP execution devices 10) in which hub 8, other than the AP process 800 including itself, can use which data.

Incidentally, although the case where the AP execution device 10 confirms whether it is possible to actually use the data in the database 2801 in the wake of the deployment of the AP software 7 (S1716) is exemplified above, the above-described confirmation may be performed when the contents of the database 2801 are updated (the data is registered, edited, or deleted) or when the database 2801 does not exist anymore, for example.

Figure 36:
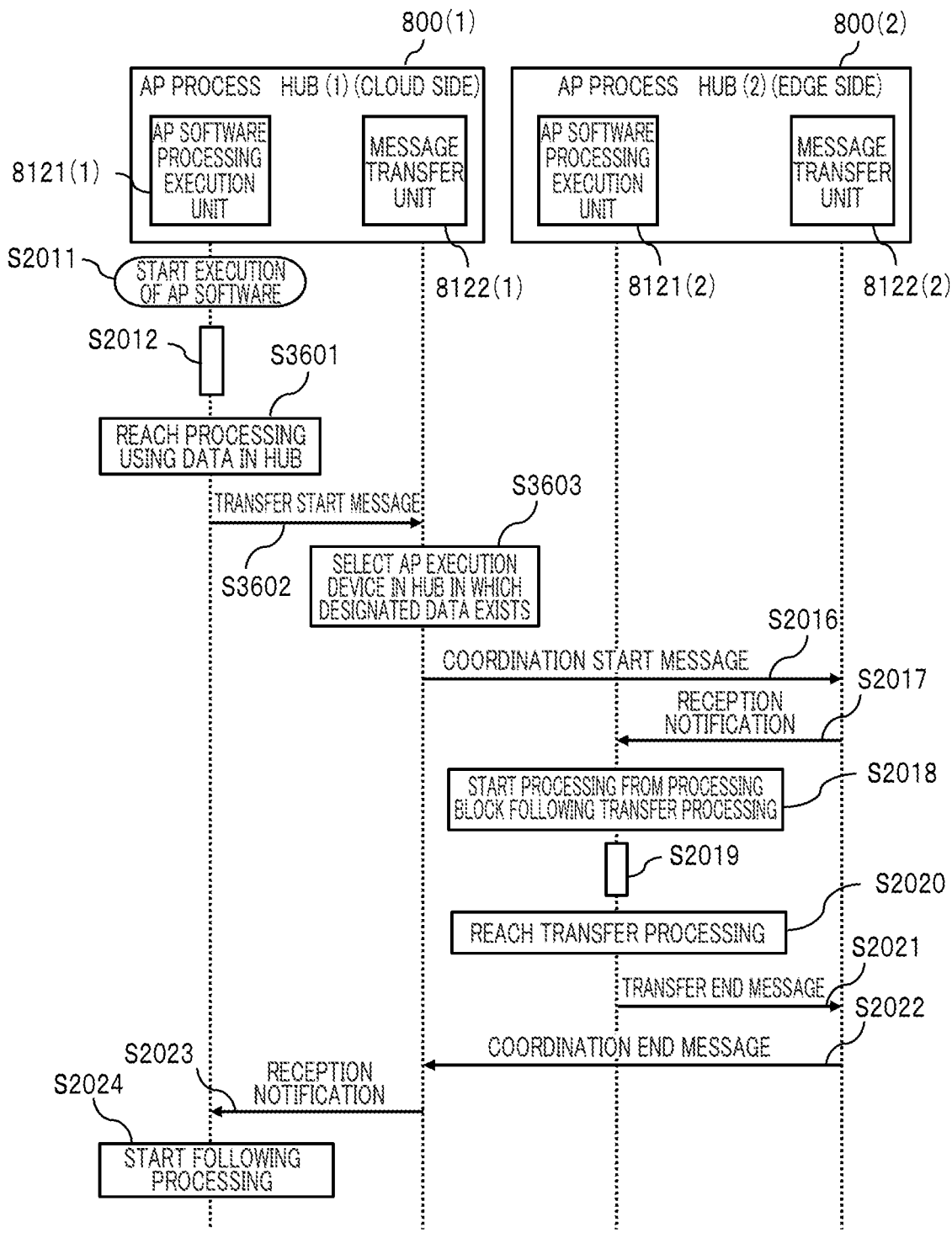
FIG. 36 is a diagram describing an AP software execution sequence in the third embodiment.

FIG. 36 is a sequence diagram describing the AP software execution sequence S2000 in the third embodiment. The AP software execution sequence S2000 in the third embodiment is different from the AP software execution sequence S2000 in the first embodiment in that the contents of the transfer start message transmitted in S2014 and the contents of the processing in S2015.

As illustrated in FIG. 36, when the execution of the processing written in the AP software 7 is started, and the processing reaches the processing (for example, the processing in the lines 3206 to 3212 in FIG. 32) using the data in the hub 8 (S3601), as with the first embodiment, the transfer start message is transmitted from the AP software processing execution unit 8121(1) to the message transfer unit 8122(1) (S3602). Note that, unlike the first embodiment, the data designation information (the data name or the like) designating the data used to execute the following processing blocks is written in the transmitted transfer start message instead of the attribute information on the hub 3 as the transfer destination.

Subsequently, the message transfer unit 8122(1) selects the AP execution device 10 that can use the data corresponding to the data designation information (S3603). This processing is, as described above, executed with the message transfer unit 8122(1) referring to the data list 453 provided from the inter-process information sharing unit 423. The processing after the AP software execution sequence S2000 is similar to that in the first embodiment.

FIG. 37 is an example of the transfer start message transmitted in S3602 in FIG. 26. Unlike the first embodiment, the data designation information (the data name) of the data used in the following processing blocks is written (in lines 3702 to 3704) in the illustrated transfer start message instead of the information indicating the attribute information on the hub 8. It should be noted that, in order to deal with processing using multiple data as well, it is also possible to write multiple pieces of the data designation information in the format of list in the transfer start message.

As described above, according to the information processing system 1 in the third embodiment, for the coordination, the AP execution device 10 that can use the data designation information (the data name or the like) written in the AP software 7 is selected automatically, and the coordination start message is transmitted to the selected AP execution device 10. Consequently, the developer does not need to figure out which hub 8 the AP execution device 10 exists in can cooperate, and can efficiently develop the AP software 7, and numerous benefits are expected particularly when many hubs 8 exist widely. Additionally, since the developer of the AP software 7 does not need to manage the DB coupling information in each hub 8, there is no need to continuously figure out the environment of each hub 8, and thus the load on the developer of the AP software 7 managing the information for the development and maintenance of the AP software 7 is reduced.

Embodiments of the present invention are described above; however, it is needless to say that the present invention is not limited to the above-described embodiments and can be changed in various ways without departing from the gist. For example, the above-described embodiments are detailed descriptions for describing the present invention in a clarifying manner and are not necessarily limited to the one having all the configurations described above. Additionally, a part of the configuration of the above-described embodiment can be changed by adding of another configuration, deletion, or displacement.

Moreover, the above-described configurations, function units, processing units, processing means, and the like may be partially or entirely implemented by hardware by designing with an integrated circuit, for example. Furthermore, the above-described configurations, functions, and the like may be implemented by software with a processor construing and executing programs implementing corresponding functions. It is possible to store information such as a program, a table, and a file implementing each function in a recording device such as a memory, a hard disk, and an SSD (Solid State Drive), or a recording medium such as an IC card, an SD card, and a DVD.

Additionally, in each of the above-described drawings, there are illustrated control lines and information lines that are considered to be required for description, and not all the control lines and information lines are necessarily illustrated. For example, it is possible to consider that almost all the configurations are coupled to each other actually.

Moreover, an arrangement configuration of the various function units, the various processing units, and the various databases of each information processing apparatus described above is merely an example. The arrangement configuration of the various function units, the various processing units, and the various databases may be changed to an optimum arrangement configuration in terms of the capabilities, the processing efficiencies, the communication efficiencies, and so on of the hardware and the software included in those devices.

Furthermore, a configuration (schema or the like) of a database storing the above-described various data may be changed flexibly in term of the efficient usage of resources, the improvement in the processing efficiency, the improvement in the access efficiency, the improvement in the search efficiency, and so on.

REFERENCE SIGNS LIST 1 information processing system
2 client device
205 storage unit
210 AP software edit unit
220 AP software transfer unit
230 attribute information obtainment and presentation unit
240 processing request transmission unit
252 attribute information
3 AP management device
305 storage unit
310 AP software reception unit
320 AP software management unit
4 cluster management device
405 storage unit
410 processing request accepting unit
420 cluster management unit
421 AP execution device information management unit
422 attribute information management unit
423 inter-process information sharing unit
451 AP execution device information
452 cluster management information
5 communication network
7 AP software
8 hub
10 AP execution device
105 storage unit
110 sensor data obtainment unit
120 process execution management unit
152 sensor data
800 process
811 AP software reception unit
812 process execution control unit
8121 AP software processing execution unit
8122 message transfer unit 813 existence notification transmission unit
153 data list
154 DB coupling information
8123 DB coupling confirmation execution unit

The invention claimed is:
1. An information processing system, comprising:
a plurality of application execution devices that are information processing apparatuses provided in each of a plurality of hubs to execute application software that is software implementing a function of an application, wherein
the application execution devices are communicably coupled to each other through a communication network,
each of the application execution devices stores common application software that executes the same processing blocks in the same order,
the application software includes transfer processing blocks that are processing blocks implementing processing to coordinate transfer of responsibility for processing of the processing blocks from a first one of the application execution devices in a first one of the hubs to a second one of the application execution devices in a second one of the hubs,
once the processing reaches a first one of the transfer processing blocks during sequential execution of the processing blocks of the application software, the first application execution device transmits a coordination start message that is a message notifying of start of the coordination to the second application execution device, and the first application execution device stops executing the processing blocks, and
once the second application execution device receives the coordination start message, the second application execution device starts sequential execution from a processing block following the first transfer processing block.
2. The information processing system according to claim 1, wherein
the coordination start message includes an execution result until a processing block right before the first transfer processing block, and
the second application execution device inputs the execution result to the processing block following the first transfer processing block.
3. The information processing system according to claim 1, wherein
once the processing reaches the first one of the transfer processing blocks during the sequential execution of the processing blocks of the application software, the first application execution device transmits a coordination start message that is a message including an identifier of the first transfer processing block and notifying of start of the coordination, to the second application execution device,
once the processing reaches a second one of the transfer processing blocks during the sequential execution of the processing blocks following the first transfer processing block, the second application execution device transmits a coordination end message that is a message including an identifier of the first transfer processing block and notifying of end of the coordination, to the first application execution device, and
once the first application execution device receives the coordination start message, the first application execution device starts sequential execution from a processing block following the second transfer processing block.
4. The information processing system according to claim 3, wherein
the coordination end message includes an execution result until a processing block right before the second transfer processing block, and
the first application execution device inputs the execution result to the processing block following the second transfer processing block.
5. The information processing system according to claim 1, wherein
the plurality of application execution devices form clusters that execute the same application software through coordination, and
the information processing system includes a cluster management device that is an information processing apparatus communicably coupled with each of the plurality of application execution devices, wherein
the cluster management device stores application execution device information that is information indicating the application execution device belonging to each of the clusters and transmits the application execution device information to each of the plurality of application execution devices.
6. The information processing system according to claim 5, wherein
the application execution device information includes information in which communication information that is information indicating a location of the application execution device in the communication network and attribute information that is information written in the application software and identifying a location of the application execution device are associated with each other.
7. The information processing system according to claim 6, wherein
the application software includes a description of the attribute information designating the second application execution device as a coordination destination, and
the application execution device identifies the location of the application execution device as the coordination destination in the communication network by comparing the description with the application execution device information.
8. The information processing system according to claim 6, wherein
the cluster management device is communicably coupled with a client device that is an information processing apparatus operated by a user and accepts setting of the application execution device information from the user through the client device.
9. The information processing system according to claim 8, wherein
the cluster management device examines error in contents of the application execution device information accepted from the user.
10. The information processing system according to claim 8, wherein
the cluster management device transmits the stored application execution device information to the client device.
11. The information processing system according to claim 6, wherein
the cluster management device accepts registration of participation of a new application execution device in the cluster and transmits the application execution device information of the accepted application execution device to the other application execution device belonging to the cluster.

12. The information processing system according to claim 11, wherein
the cluster management device performs an existence confirmation on an application process that is a process executing the application software generated in the application execution device belonging to one of the clusters through the communication network, and once the existence of the application process of one of the application execution devices cannot be confirmed anymore, the cluster management device causes the application execution device to leave the cluster and notifies the other application execution device of the leaving of the application execution device from the cluster.

13. The information processing system according to claim 6, wherein
the cluster management device
is communicably coupled with a client device that is an information processing apparatus operated by a user,
receives the application software from the client device and stores the application software, and
transmits the application software to the application execution device in response to a request for obtaining the application software transmitted from the application execution device.

14. The information processing system according to claim 13, wherein
the cluster management device is communicably coupled with an application management device that is an information processing apparatus managing versions of the application software, and obtains the application software from the application management device and stores the application software.

15. The information processing system according to claim 1, wherein
a data list that is information indicating data that can be used in each of the plurality of application execution devices is managed, and
once the processing reaches the first one of the transfer processing blocks during the sequential execution of the processing blocks of the application software, the first application execution device selects the application execution device that can use data as the second application execution device based on the data list, the data being written in the first transfer processing block and corresponding to data designation information that is information designating data in the second hub, and
transmits the coordination start message that is the message notifying of start of the coordination, to the selected second application execution device, and
once the second application execution device receives the coordination start message, the second application execution device starts the sequential execution from the processing block following the first transfer processing block.

16. The information processing system according to claim 15, wherein
each of the application execution devices is communicably coupled with a database managing data used in the execution of the application software, and
the application execution device accesses the database to verify whether it is possible to obtain data corresponding to the data designation information written in the application software that is deployed to the application execution device, and
when it is possible to obtain the data, the data is managed in the data list.

17. The information processing system according to claim 16, includes
a plurality of information processing apparatuses that are communicably coupled with the application execution devices, respectively, and update and manage the data list by a distributed processing method.

18. The information processing system according to claim 16, wherein
each of the application execution devices individually manages database coupling information that is information required for each application execution device to couple to the database.

19. A method of controlling an information processing system that includes a plurality of application execution devices that are information processing apparatuses provided in each of a plurality of hubs to execute application software that is software implementing a function of an application, the application execution devices being communicably coupled to each other through a communication network, comprising:
storing common application software that executes the same processing blocks in the same order by each of the application execution devices;
including transfer processing blocks that are processing blocks implementing processing to coordinate transfer of responsibility for processing of the processing blocks from a first one of the application execution devices in a first one of the hubs to a second one of the application execution devices in a second one of the hubs by the application software;
once the processing reaches a first one of the transfer processing blocks during sequential execution of the processing blocks of the application software, transmitting a coordination start message that is a message notifying of start of the coordination to the second application execution device by the first application execution device, and stopping execution of the processing blocks by the first application execution device; and
once the second application execution device receives the coordination start message, starting sequential execution from a processing block following the first transfer processing block by the second application execution device.

20. The method of controlling an information processing system according to claim 19, comprising:
managing a data list that is information indicating data that can be used in each of the plurality of application execution devices;
by means of the first application execution device,
once the processing reaches the first one of the transfer processing blocks during the sequential execution of the processing blocks of the application software, selecting the application execution device that can use data as the second application execution device based on the data list, the data being written in the first transfer processing block and corresponding to data designation information that is information designating data in the second hub, and
transmitting the coordination start message that is the message notifying of start of the coordination, to the selected second application execution device; and, by means of the second application execution device, once the second application execution device receives the coordination start message, starting the sequential execution from the processing block following the first transfer processing block.

\* \* \* \* \*